(12) United States Patent
Bell

(10) Patent No.: US 10,620,625 B2
(45) Date of Patent: Apr. 14, 2020

(54) VEHICLE CONTROL SYSTEM

(71) Applicant: GE Global Sourcing LLC, Norwalk, CT (US)

(72) Inventor: David Bell, Jacksonville, FL (US)

(73) Assignee: GE GLOBAL SOURCING, Norwalk, CT (US)

(*) Notice: Subject to any disclaimer, the term of this patent is extended or adjusted under 35 U.S.C. 154(b) by 0 days.

(21) Appl. No.: 16/356,075

(22) Filed: Mar. 18, 2019

(65) Prior Publication Data
US 2019/0212726 A1    Jul. 11, 2019

Related U.S. Application Data

(63) Continuation of application No. 15/211,104, filed on Jul. 15, 2016, now Pat. No. 10,274,951, which is a continuation-in-part of application No. 14/027,327, filed on Sep. 16, 2013, now abandoned.

(60) Provisional application No. 61/703,795, filed on Sep. 21, 2012.

(51) Int. Cl.
G05D 1/00       (2006.01)
G06F 3/0484     (2013.01)
G06F 3/0482     (2013.01)
B61L 27/02      (2006.01)
G06Q 10/06      (2012.01)
G06Q 10/08      (2012.01)
G06Q 50/28      (2012.01)

(52) U.S. Cl.
CPC ............ *G05D 1/0027* (2013.01); *B61L 27/02* (2013.01); *G05D 1/0044* (2013.01); *G06F 3/0482* (2013.01); *G06F 3/04842* (2013.01); *G06Q 10/06313* (2013.01); *G06Q 10/06314* (2013.01); *G06Q 10/06315* (2013.01); *G06Q 10/08* (2013.01); *G06Q 50/28* (2013.01)

(58) Field of Classification Search
CPC .... G05D 1/0027; G05D 1/0044; B61L 27/02; G06F 3/0482; G06F 3/04842; G06Q 10/06313; G06Q 10/06314; G06Q 10/06315; G06Q 10/08
USPC ............................................................ 701/2
See application file for complete search history.

(56) References Cited

U.S. PATENT DOCUMENTS

| | | | |
|---|---|---|---|
| 8,160,971 B2* | 4/2012 | Knight | G06Q 10/08 705/1.1 |
| 10,086,782 B1* | 10/2018 | Konrardy | G05D 1/0088 |
| 2007/0030169 A1* | 2/2007 | McNay | G08G 1/202 340/932.2 |

* cited by examiner

Primary Examiner — Muhammad Shafi
(74) Attorney, Agent, or Firm — The Small Patent Law Group LLC; Mary D. Lawlor

(57) ABSTRACT

A vehicle control system includes a controller that is configured to generate control signals for moving vehicles in a yard or other facility. The vehicle control system is configured to generate the control signals responsive to a determination that a user selection of vehicle movement is possible within the yard or other facility.

17 Claims, 25 Drawing Sheets

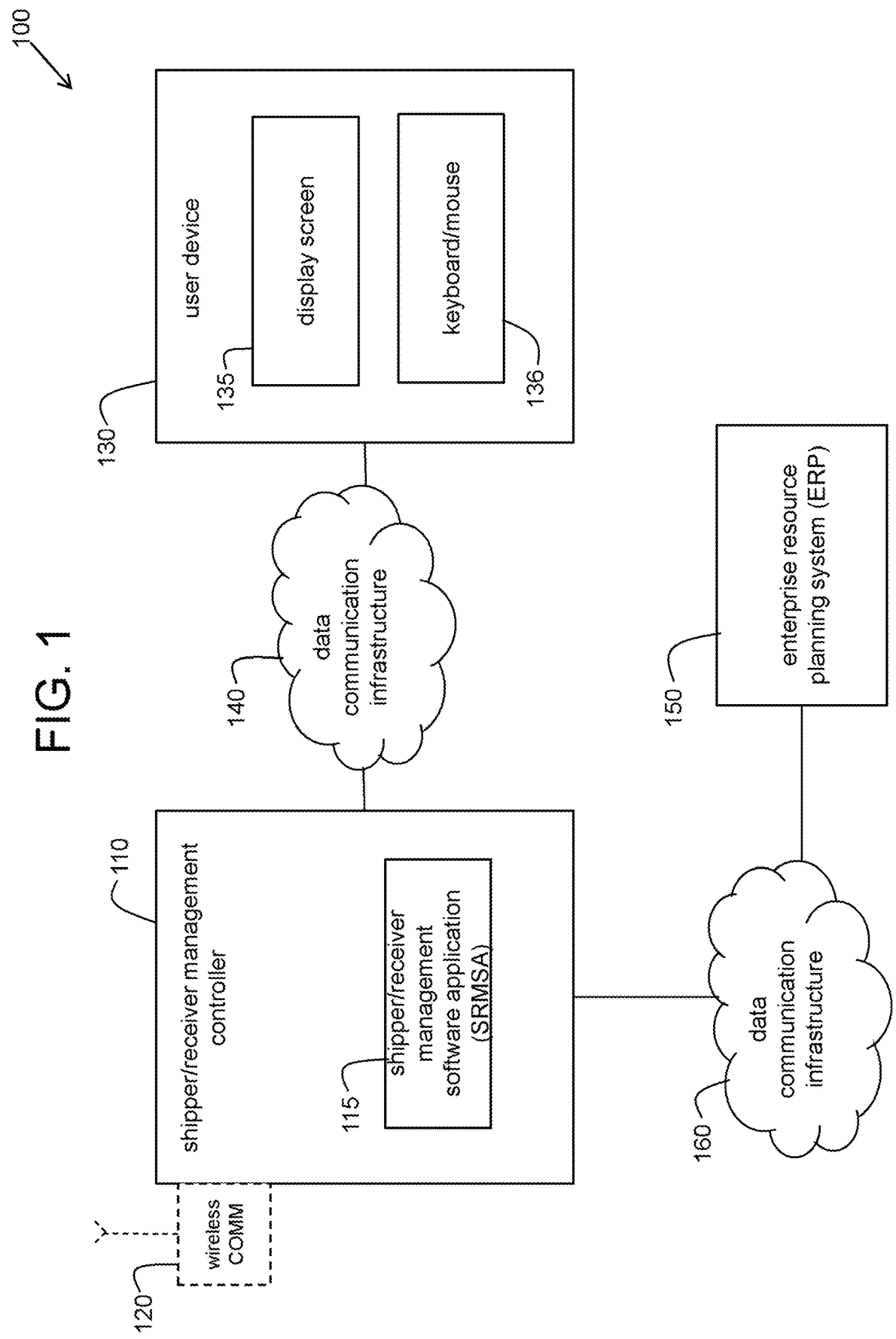

Equipment Groups
double-click to edit

| Select | Edit | Name | Active |
|--------|------|------|--------|
| ☐ | Edit | ABCARS | Active |
| ☐ | Edit | FREECARD | Active |
| ☐ | Edit | TOLUENE | Inactive |

Insert   Delete

FIG. 15

| Select | Edit | Abbreviation | | | Description | Active |
|---|---|---|---|---|---|---|
| ☐ | Edit | B | Insert | Delete | BOXCARS | Active |
| ☐ | Edit | H | | | HOPPER CARS | Active |
| ☐ | Edit | G | | | GONDOLAS | Inactive |

Equipment Kinds

Location Detail

Area: My Piles
Name: Iron Pellets
Description: Iron Pellets Pile
Location Type: Pile
Capacity Max:
Unit of Measure: Tons
Customer: The Large Iron Company
Product: Iron Pellets ☑ Active Capacity Min:

Last Modified User: RMTESTING    Date: 5/20/2012 13:46

[Save]  [Save and Close]  [Cancel]

1600

VEHICLE CONTROL SYSTEM

CROSS-REFERENCE TO RELATED APPLICATIONS

This application is a continuation of U.S. patent application Ser. No. 15/211,104, filed 15 Jul. 2016, which is a continuation-in-part of U.S. patent application Ser. No. 14/027,327, filed 16 Sep. 2013, which claims priority to U.S. Provisional Application No. 61/703,795, filed 21 Sep. 2012. The entire disclosures of these applications are incorporated herein by reference.

BACKGROUND

Field

The subject matter disclosed herein relates to systems for vehicle control.

Discussion of Art

A switching yard or other facility may have vehicles (e.g., storage containers, cars, on-site transportation vehicles, off-site transportation vehicles) located throughout which are to be managed in various ways (e.g., moved, loaded, unloaded, stacked, linked, assigned). Keeping track of the vehicles and the status of the vehicles in the yard (and during transportation between facilities) can be challenging. It may be desirable to have a system that controls vehicles within and between facilities better than those systems that are currently available.

BRIEF DESCRIPTION

In one embodiment, a system includes a controller operable to provide selectable options to a user for managing at least one of products or vehicles within a first shipper/receiver (S/R) facility and to control generation of displayed graphical representations of the first S/R facility, the at least one of products or vehicles within the first S/R facility, and one or more characteristics of the at least one of products or vehicles. The controller also is operable to receive input from the user to move at least one of the displayed graphical representations of the products or the vehicles to indicate one or more of moving the one or more of the products or the vehicles into storage, moving the one or more of the products or the vehicles out of the storage, repair of the one or more of the products or the vehicles, or replenishing the one or more of the products or the vehicles. The controller is operable to compare the input from the user with one or more designated criteria to determine whether the move, the repair, or the replenishment of the one or more products or the vehicles that is input by the user is possible in the first S/R facility and, responsive to determining that the move, the repair, or the replenishment of the one or more products or the vehicles that is input by the user is not possible, provide an indication to the user that the move, the repair, or the replenishment of the one or more products or the vehicles that is input from the user is not possible.

BRIEF DESCRIPTION OF THE DRAWINGS

Reference is made to the accompanying drawings in which particular embodiments of the inventive subject matter are illustrated as described in more detail in the description below, in which:

FIG. 1 is a schematic block diagram of one embodiment of a system to visually and graphically manage products, vehicles, and activities within and between shipper and receiver facilities;

FIGS. 5A and 5B illustrate embodiments of display screens of a list view of a shipper/receiver facility generated by the system of FIG. 1;

FIGS. 6A and 6B illustrate embodiments of display screens showing how to sort and filter using the list view of FIGS. 5A and 5B;

FIGS. 9A and 9B illustrate exemplary embodiments of display screens showing the color coding of vehicles and products in the list view of FIGS. 5A and 5B;

FIG. 11 illustrates an embodiment of a display screen generated by the system of FIG. 1 showing information associated with providing interchange support of inbound vehicles into the S/R facility;

FIG. 14 illustrates an embodiment of a display screen generated by the system of FIG. 1 showing information associated with an equipment group master list;

FIG. 15 illustrates an embodiment of a display screen generated by the system of FIG. 1 showing information associated with an equipment kind master list;

FIG. 16 illustrates an embodiment of a display screen generated by the system of FIG. 1 showing information associated with a location (e.g., storage area) master list;

DETAILED DESCRIPTION

Figure 2A:
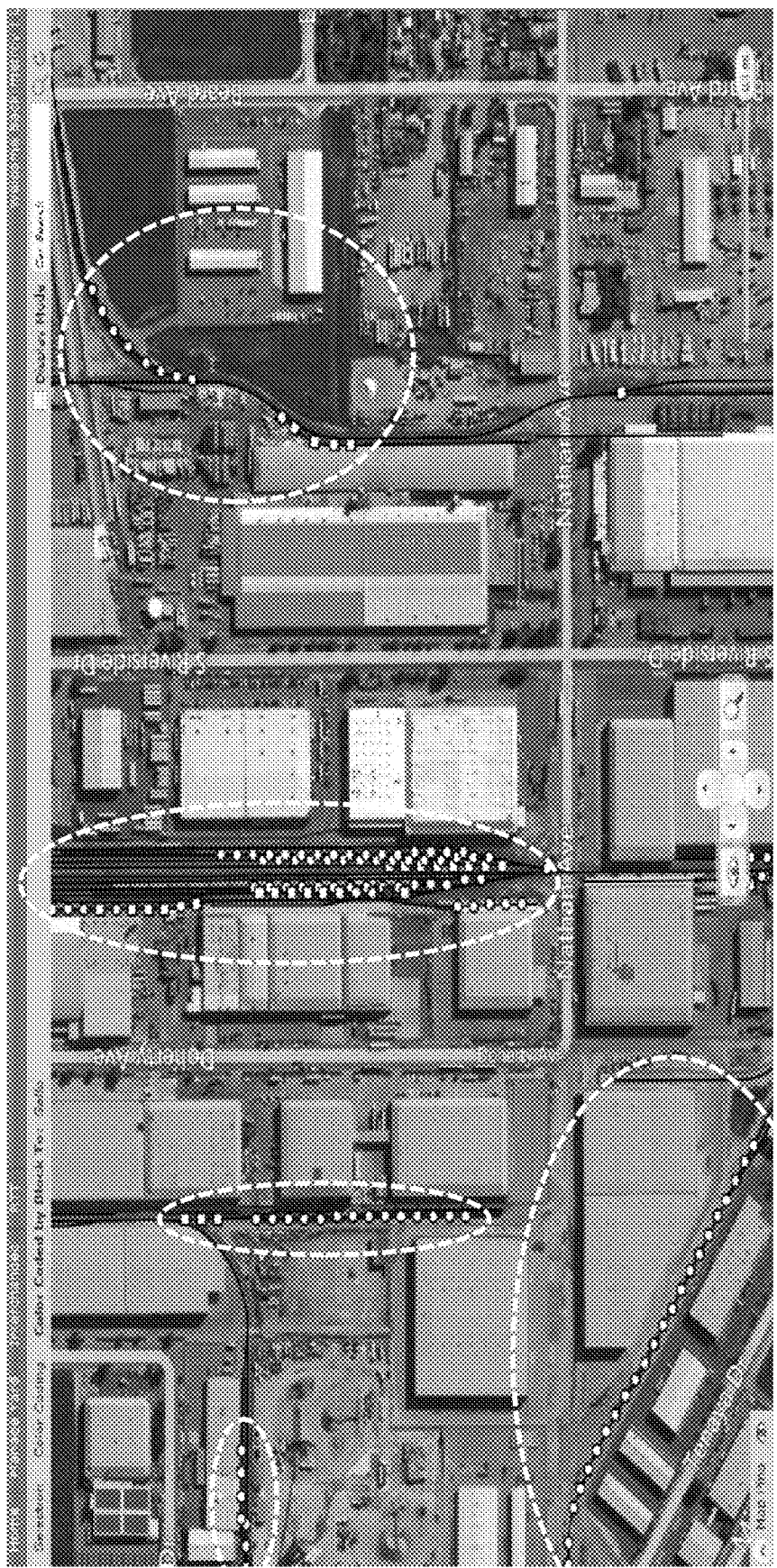
FIGS. 2A and 2B illustrate embodiments of display screens of a map view of a shipper/receiver facility generated by the system of FIG. 1.

The subject matter disclosed herein relates to methods and systems for managing vehicles, products, storage, and transportation within and between shipping and receiving facilities of a shipper or a receiver. Embodiments of the inventive subject matter relate to methods and systems providing virtual representations and a graphical interface for managing products and vehicles within and between shipping and receiving facilities such as plants, yards, ports, and warehouses.

Some shippers may be concerned with a production process and where to place a product after it has been produced. For example, produced material may be in the form of bulk product (e.g., chemicals) and may be placed in a storage container. Some shippers use vehicles (e.g., rail cars, barges, trailers, etc.) as storage containers in addition to other transportation vehicles. Therefore, when material is produced, a shipper may ensure that vehicles are present to accept the product. A shipper may desire to keep track of product inventory in the shipper facility to support dispatching product out to customers and may further desire to track the product all the way to the destination point of the product during shipping to a customer (e.g., a receiver).

Receivers are concerned with inventory and knowing how much product is on hand and how many days of production can be supported. Receivers are also concerned with inbound deliveries of materials and product including how much product is on its way, how far away the product is, and how many days out the product is. A shipper or receiver works closely with, for example, a rail carrier such that product ends up where it is supposed to be on time. In accordance with an embodiment, communication between a shipper or receiver and a rail carrier takes place via electronic data interchange (EDI) communications.

The term "product" refers to any materials or manufactured goods that may be transported. The term "shipper" refers to an entity in the business of shipping products via some form of transportation (e.g., via rail cars on a railroad). A shipper may or may not also be in the business of producing, mining, or processing the product (e.g., coal) to be shipped. The term "receiver" refers to an entity in the business of receiving products from shippers via some form of transportation (e.g., via tractor trailers). A receiver may or may not also be in the business of using or further processing the product (e.g., plastic pellets).

The terms "container" and "trailer" refer to a storage medium or area configured to hold products, goods, or other shippable or receivable materials. The term "shipper or receiver (S/R) facility" refers to a facility, location, site, or area where products and assets are managed. The term "S/R facility" may be used as a facility of a shipper, a receiver, or both. The managing of products and vehicles may include, for example, moving, loading, unloading, storing, stacking, linking, assigning, shipping, and receiving the products and vehicles. Examples of vehicles include, but are not limited to, rail cars; ships; other shipping transportation vehicles; storage containers or storage areas for storing products or vehicles; containers/trailers that may be loaded/unloaded with product and loaded/unloaded from other vehicles, ships, or other shipping transportation vehicles; or transportation vehicles for moving, loading, and unloading products within the S/R facility.

"Software" or "computer program" as used herein includes computer readable and/or executable instructions, stored in a non-transitory computer-readable medium, that cause a controller or other electronic device to perform designated functions, designated actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system, or other type of executable instructions. It will be appreciated by one of ordinary skill in the art that the form of software may be dependent on, for example, requirements of a desired application, the environment it runs on, and/or the desires of a designer/programmer or the like.

"Computer" or "processing element" or "computer device" as used herein includes, but may be not limited to, any programmed or programmable electronic device that may store, retrieve, and process data. "Non-transitory computer-readable media" include, but may not be limited to, a CD-ROM, a removable flash memory card, a hard disk drive, a magnetic tape, and a floppy disk. "Computer memory", as used herein, refers to a storage device configured to store digital data or information which may be retrieved by a computer or processing element. "Controller", as used herein, refers to the circuits/circuitry, logic circuits/circuitry, and/or processing elements, possibly including associated software or program(s) stored in a non-transitory computer-readable medium, that is configured for the managing of vehicles and products associated with the S/R facility as set forth herein. The terms "signal", "data", and "information" may be used interchangeably herein and may refer to digital or analog forms. The term "communication device" as used herein may refer to any wired or wireless device (e.g., a computer modem) operable to receive and/or transmit signals, data, or information. The term "virtual" as used herein refers to the simulation of real-world objects and characteristics in a computer environment.

Some of the systems and methods described herein may be discussed in the context of shippers and receivers using rail cars and railroad transportation. However, embodiments of the inventive subject matter may apply equally well to other types of shippers and receivers using other types of transportation such as, for example, port entities using sea-going vessels, mining equipment, on-road trucks, and the like.

In one embodiment, a system may monitor vehicle and container dwell times. Monitoring dwell time may allow control that influences productivity, may reduce or eliminate demurrage charges, may capture vehicle or container inspection information, may report vehicle or container status, may capture a characteristic parameter relating to a product or group of products or a vehicle or group of vehicles, and may pre-block vehicles and containers for efficient hand off to an operator or carrier. Vehicles and containers may be pre-blocked according to a destination or other parameter. For example, a railway train may have a pre-defined number of blocks, and a shipper may communicate with a rail carrier to assemble a block of cars to fill a block in the train.

FIG. 1 is a schematic block diagram of an embodiment of a system 100 to visually and graphically manage products, vehicles, and activities within and between S/R facilities. The S/R facility may be, for example a plant, a yard, a port, a warehouse, or a lot or any location and/or facility where products and vehicles may be managed (e.g., moving, loading, unloading, storing, stacking, linking, assigning, shipping, and receiving the vehicles and products). Vehicles associated with the S/R facility may be loaded or unloaded with product at the S/R facility. Embodiments of the inventive subject matter described herein provide functionality associated with the loading/unloading process and provide integration to the enterprise resource planning system (ERP) of a shipper or receiver.

The system may include a shipper/receiver management controller 110 operable to manage products, vehicles, transactions, and activities taking place within the S/R facility. The controller 110 is operable to facilitate the virtual representation of the S/R facility and products and vehicles located in the S/R facility, along with characteristics of the products and vehicles. Selectable options may facilitate managing the products and vehicles within the S/R facility through a graphical interface. Functionality allowing interfacing with an entity that delivers vehicles (e.g., rail cars) to the S/R facility may be provided. For example, the system may respond to a vehicle or container being ready for dispatch by initiating an electronic data interchange (EDI) request. The request may instruct a carrier to come and get the vehicle or container from a shipper's facility. Similarly, if the carrier holds a container for a shipper, the EDI request may be made instructing the carrier to deliver the container to the shipper's facility. Integrated inbound and outbound asset and product visibility may be provided, along with automation of key tasks and production of work orders for train crews.

In one embodiment, the S/R management controller 110 may be implemented as a computer server running a shipper/receiver management software application (SRMSA) 115. The S/R management controller may manage products and vehicles within the S/R facility (e.g., the assignment, loading, unloading, and movement of products and vehicles within the S/R facility) and may provide a graphical mapping that allows visualization of the S/R facility by a user on a display screen. The S/R management controller may provide a graphical mapping that supports visualization of transportation vehicles, having product loaded thereon, in transit (en route) between S/R facilities along with estimated times of arrival.

As an option, the system may include a wireless communication (COMM) device 120 operably interfacing to the controller and able to communicate with other wireless devices (e.g., via radio frequency communication) operating within the S/R facility. Such other wireless devices may be hand-held devices used by inspectors or may be located in on-site transportation vehicles within the S/R facility.

The system may include a user device 130 (e.g., a desktop personal computer, a hand-held tablet computer, or a mobile telephone) having a user interface including a display screen 135 (e.g., a touchscreen display) and, optionally, a keyboard and/or a mouse 136. The user device may communicate with the S/R management controller either directly or via a data communication infrastructure 140 (e.g., a computer network). The user device may be located in an office on site at the S/R facility or may be remotely located away from the S/R facility. In accordance with an embodiment, the user device may be a mobile, wireless, touch-screen, hand-held device that may be used by a user as the user walks or drives around the S/R facility (e.g., if the user is part of a maintenance crew). The system may provide a directional locator function, directing a user to a product or vehicle within the S/R zone that may be selected by the user.

The system may include an enterprise resource planning system (ERP) 150 in operative communication with the S/R management controller 110 via, for example, a data communication infrastructure 160 (e.g., the internet). The ERP 150 may be configured to manage various aspects (e.g., scheduling, tracking, way billing, revenue accounting) of a larger enterprise such as, for example, an entire shipping company having multiple S/R facilities. Therefore, the ERP 150 may communicate with a plurality of S/R management controllers at a plurality of S/R facilities of a shipper or receiver.

If the S/R management controller is on site at the S/R facility, the user device may communicate in a direct wired manner with the controller, or via a data communication infrastructure that may be a local area network. If the S/R management controller is remotely located from the S/R facility, then communication with the user device may be via a larger network, such as the internet. For example, the S/R management controller may be co-located with or be implemented on a same server computer as the ERP 150. As another example, the S/R management controller may be hosted at a third-party site (e.g., a provider of the SRMSA) as a software-as-a-service (SaaS) configuration. As a further example, the data communication infrastructures may be the same network (e.g., the internet). Other configurations may be possible as well, in accordance with various other embodiments.

Shipping vehicles may be located throughout the S/R facility, may be loaded or unloaded, and may or may not be linked to a block of, e.g., rail cars to be moved by one or more locomotives of a railroad as a train. In one embodiment, the system provides a graphical interface on a display screen of the user device allowing a user to manage products and vehicles in the S/R facility. A user may interact with the S/R management controller via the user interface device to configure the layout of the S/R facility and tracks, paths, or other vehicle routes within the S/R facility. The resultant configuration may reflect the current state of the S/R facility or may reflect a desired state of the S/R facility to be implemented, or may represent both (e.g., using different visual style elements). In one embodiment, the user can interact with the S/R management controller to change a state of switches at intersections between two or more routes. For example, a first route may intersect with second and third routes at a switch. In a first state, the switch directs a vehicle traveling on the first route to travel onto the second route from the first route and, in a different, second state, the switch directs a vehicle traveling on the first route to travel onto the third route from the first route. A user can provide input into the controller and the controller can communicate a control signal to a motor coupled with one or more points of the switch to cause the motor to move the points and change the state of the switch. As another example, the user can interact with the S/R management controller to move one or more of the vehicles. For example, the user can provide input into the controller and the controller can communicate a control signal to a motor or other propulsion-generating device of a first vehicle (or to a second vehicle that moves the second vehicle) that directs the motor or device to move the first vehicle according to the input provided by the user. A user may then view the location of vehicles on vehicle routes (e.g., rail cars on tracks) within the S/R facility, check the status of a vehicle or container, update (move) the location of the vehicle or container or other vehicle within the S/R facility (which can cause automatic movement of the vehicle, as described above), and review or enter transportation (e.g., waybill/Bill of Lading) information for the vehicle and/or container. A user may create if-then logic to help plan and manage vehicle movements within the S/R facility. For example, responsive to determining that a vehicle is in a designated location, has cargo loaded or unloaded from the vehicle, or other change in state of the vehicle, the controller can generate a control signal to move the vehicle to another location in or outside of the facility. Checking the status of the vehicle may involve, for example, checking if a car is loaded and with what product or commodity, checking the identity of the receiver of the loaded commodity, checking the assigned destination of the vehicle (e.g., a container), and checking the owner (or lessor) of the vehicle. Waybill information for the asset may be checked and Bill of Lading information entered using the system of FIG. 1. In one embodiment, the user device may be used to verify tracking information physically associated with the vehicle, such as a radio frequency identification (RFID) or automatic equipment identification (AEI) tag, or a barcode, or the like. That user device might scan the associated indicia and match the indicia against the status information. The user may make updates or corrections to errors on the spot.

A method is provided in one embodiment that includes obtaining shipping or receiving information associated with products and vehicles located within the S/R facility. The obtained shipping or receiving information may be processed for the generation of displayed graphical representations of the products and vehicles located within the S/R facility. This may be done along with characteristics of the products and vehicles. Selectable options may be then provided to a user for reviewing and editing the shipping or receiving information.

The obtained shipping or receiving information may be processed for the generation of displayed graphical representations of the products and vehicles en route (in transit) between two or more S/R facilities. The processed shipping information may be passed to others, such as carriers, to facilitate transportation services. This information passing may be done, for example, via EDI communications. The graphical representations may be displayed as graphical icons and/or text information. The shipping or receiving information may be obtained from an enterprise resource planning system and may include Bill of Lading or waybill information. An analytic "dashboard" may provide status overviews on planning and productivity measures. Configurable role-based views may allow a user to make strategic decisions to manage upcoming work, optimize capacity, and reduce operating costs.

Figure 2B:

FIGS. 2A and 2B illustrate two views of at least a first embodiment of a displayed graphical representation(s) 200 of the S/R facility provided by the system of FIG. 1, e.g., the user device 130 may be configured to display the graphical representation(s) 200 on the display screen 135. The graphical representation may comprise an aerial view (top down view) of the S/R facility. The aerial view may be a map (i.e., map view) of the S/R facility, or it may be an aerial photographic view (such as a satellite view, as in FIGS. 2A and 2B) of the S/R facility, or it may combine elements of the two, e.g., an aerial photographic view overlaid with displayed map elements to highlight portions of the aerial photographic view. (The system may be configured to modify the aerial photographic view of the S/R facility, to remove non-static elements of the photographic view that may change in actuality between when the photographic view was generated and when it is displayed in the system. For example, unless the photographic view is generated in real time or otherwise regularly periodically generated (which it is in embodiments), vehicles captured in the photographic view may have been moved by the time the photographic view is displayed for use. Thus, such vehicles captured in the photographic view may be removed from the view, leaving only the static infrastructure of the S/R facility in the view.) The aerial view may include displayed graphical representations of one or more routes of the S/R facility. For example, if the S/R facility includes one or more railroad tracks linked to an external rail transportation network or otherwise, the aerial photographic view may include displayed graphical representations of the one or more railroad tracks. In another example, if the S/R facility includes one or more roads linked to an external highway network or other road network or otherwise, the aerial photographic view may include displayed graphical representations of the one or more roads.

In embodiments, the system is also configured to display vehicle information (e.g., rail car information and storage area information) and/or product information (e.g., raw material information) as part of and/or in conjunction with the displayed graphical representations of the S/R facility. For example, the system may be configured to display the vehicle information and/or the product information as icons overlaid on the displayed aerial view of the S/R facility. Examples are shown in FIGS. 2A and 2B—see the icons indicated with the regions of the dashed white circles of FIG. 2A, and similar icons on FIG. 2B. The icons provide cues and/or information about the status and/or locations of vehicles and/or products, which may include a vehicle identification (ID) code, a loaded product type, product availability, product amount, a destination, an origin, a container type, vehicle health, equipment status, maintenance status, and/or load status.

In one embodiment, for an S/R facility that includes one or more routes and where the vehicles are container-carrying vehicles and/or shipping containers transported by the container-carrying vehicles, the system may be configured to display a graphical representation of the S/R facility as an aerial view, including representations of the routes, and graphical representations of the vehicles and/or shipping containers overlaid on the aerial view in relation to the routes. For example, the displayed graphical representations of the vehicles and/or shipping containers may be positioned with respect to the displayed routes in correspondence with actual locations of the vehicles and/or shipping containers relative to the routes in the S/R facility. The correspondence may be exact, such as exact positions of the vehicles and/or shipping containers as determined via GPS or other sensors, or it may be approximate, such as the graphical representations of the vehicles and/or shipping containers being displayed in general association, and not necessarily exactly located, with a particular section of displayed asset route. For example, for railcars on a siding, it may be sufficient merely to show the railcars on the siding, and without exact positions of the railcars.

As indicated, some S/R facilities may include railroad tracks as routes, and the vehicles may be railcars and/or shipping containers carried by railcars. For such S/R facilities, the system may be configured to display a graphical representation of the S/R facility as an aerial view, including displayed graphical representations of the railroad tracks, and graphical representations of the railcars and/or shipping containers overlaid on the aerial view in relation to the displayed graphical representations of the railroad tracks.

In embodiments, the displayed graphical representation of the S/R facility (aerial view or otherwise) includes displayed infrastructure of the S/R facility other than routes, vehicles, and products of the S/R facility. For example, the displayed graphical representation of the S/R facility may include displayed graphical representations of buildings of the S/R facility, storage tanks and other infrastructure that hold products, waterways and other bodies of water, vegetation, and infrastructure not directly associated with S/R facility, e.g., roadways and buildings that are adjacent the S/R facility but not part of the S/R facility.

The system may be configured to generate a displayed "refresh" icon. The refresh icon allows a user to update the displayed graphical representation to show the current inventory (products and vehicles) in the facility as overlaid icons (e.g., see the overlaid icons within the dashed ovals of FIG. 2A). Also, the inventory (and associated information) may be automatically updated on a determined schedule. The updated information may be received by the controller from the ERP 150, in accordance with an embodiment, and processed by the SRMSA 115 to refresh the view on the display screen 135 of the user device 130.

The system may be configured for a user to also mark locations in the map view using marker points. A marker point is a point of interest on the map view that is selected by the user, which stays fixed until cleared by the user, and which may act as a reference point in the system for performance of one or more functions of the system. Such functions may include map zoom-in (i.e., generate an enlarged view of the aerial view) and zoom-out (i.e., generate a reduced view of the aerial view), e.g., zoom-in or zoom-out is carried out with reference to the marker point, and view indexing, e.g., if the user switches to another view and then returns to the view with the marker point, the view with the marker point is centered on the marker point, and/or the system may be configured to display a list of the extant maker points for switching between the views of the marker points based on user selection of the marker points in the list. The system may be configured to designate the marker points using displayed graphical representations, such as displayed graphical representations of pins (that is, an element displayed on the display that resembles a pushpin). In an embodiment, the system is configured so that when a marker point is designated by a user (e.g., a pin is placed), the system zooms in on the "pinned" location where the user desires to work. To add a new pin, a user may click on an "Add Pin" icon of the window and then click on the location to be pinned. An "Add Pin" pop-up window may appear, and the user may enter a name for the pin and specify whether the pin should be visible to only the user ("my view") or to all users ("shared view"). A pin may designate a default view such that, when a user goes to the map view, the view will open to that pin. In the map view, a user may switch between pin locations by either selecting a pin from a list in the window, or by clicking on the pin directly on the map (e.g., using a mouse).

Figure 3:
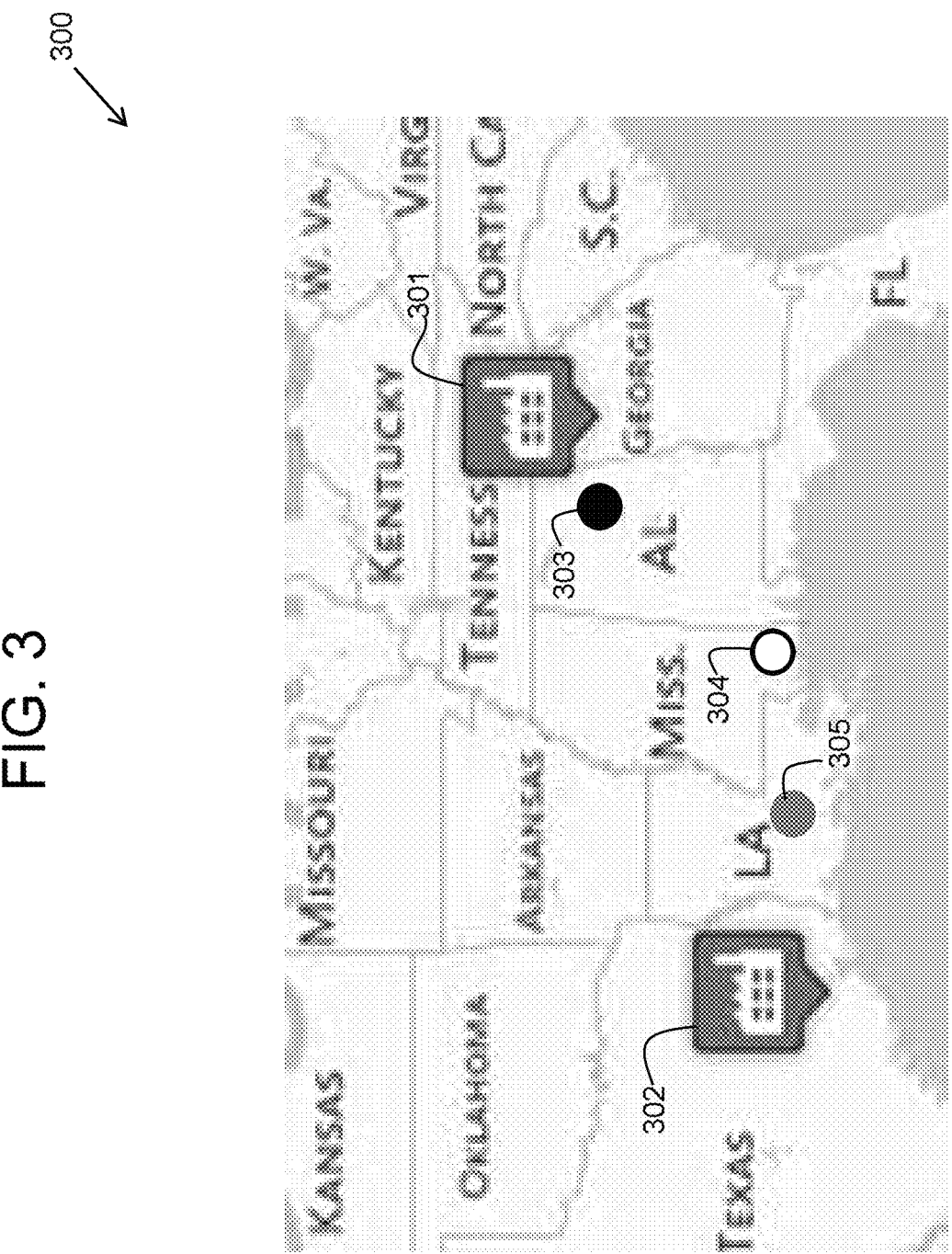
FIG. 3 illustrates a second embodiment of a display screen of a map view of a transportation route generated by the system of FIG. 1.

FIG. 3 illustrates an embodiment of a displayed map view 300 of a transportation route provided by the system of FIG. 1. The map view may be a graphic representation of a transportation route between two S/R facilities showing icons of vehicles carrying products in route between the two S/R facilities. A displayed icon 301 of a shipping facility may indicate on the map view as being located in a first location of the map (in the example of FIG. 3, Georgia). A displayed icon 302 of a receiving facility may be indicated on the map view as being located in a second location of the map (in the example of FIG. 3, Texas). A first group of vehicles and/or containers en route from the shipping facility to the receiving facility may be indicated by the icon 303, which may be located in a third location of the map (in this example, Alabama). A second group of vehicles and/or containers en route from the shipping facility to the receiving facility may be indicated by the icon 304 which may be located in a fourth location of the map (in this example, Mississippi). A third group of vehicles and/or containers en route from the shipping facility to the receiving facility may be indicated by the icon 305, which may be located in a fifth location of the map (in this example, Louisiana). Color coding of the icons, icon shape, and other icon characteristics may be used to indicate various vehicle characteristics including, for example, product type being transported by the vehicles and vehicle container type. A user may place a cursor over an asset icon (e.g., using a computer mouse, touchscreen manipulation, or other user input device) to view additional information (e.g., in text format) about the vehicle. The additional information may include, for example, weight information about the vehicles and/or containers or product loaded on the vehicles and/or containers, or other way billing information. In one embodiment, there may be an option to toggle to an enhanced mode that addresses disabilities in the user, such as blindness, color blindness, deafness, and the like. Enabling such an option may switch the icons and graphical representations into another mode of presentation—such as to audio, tactile, text, or another mode.

Figure 4:
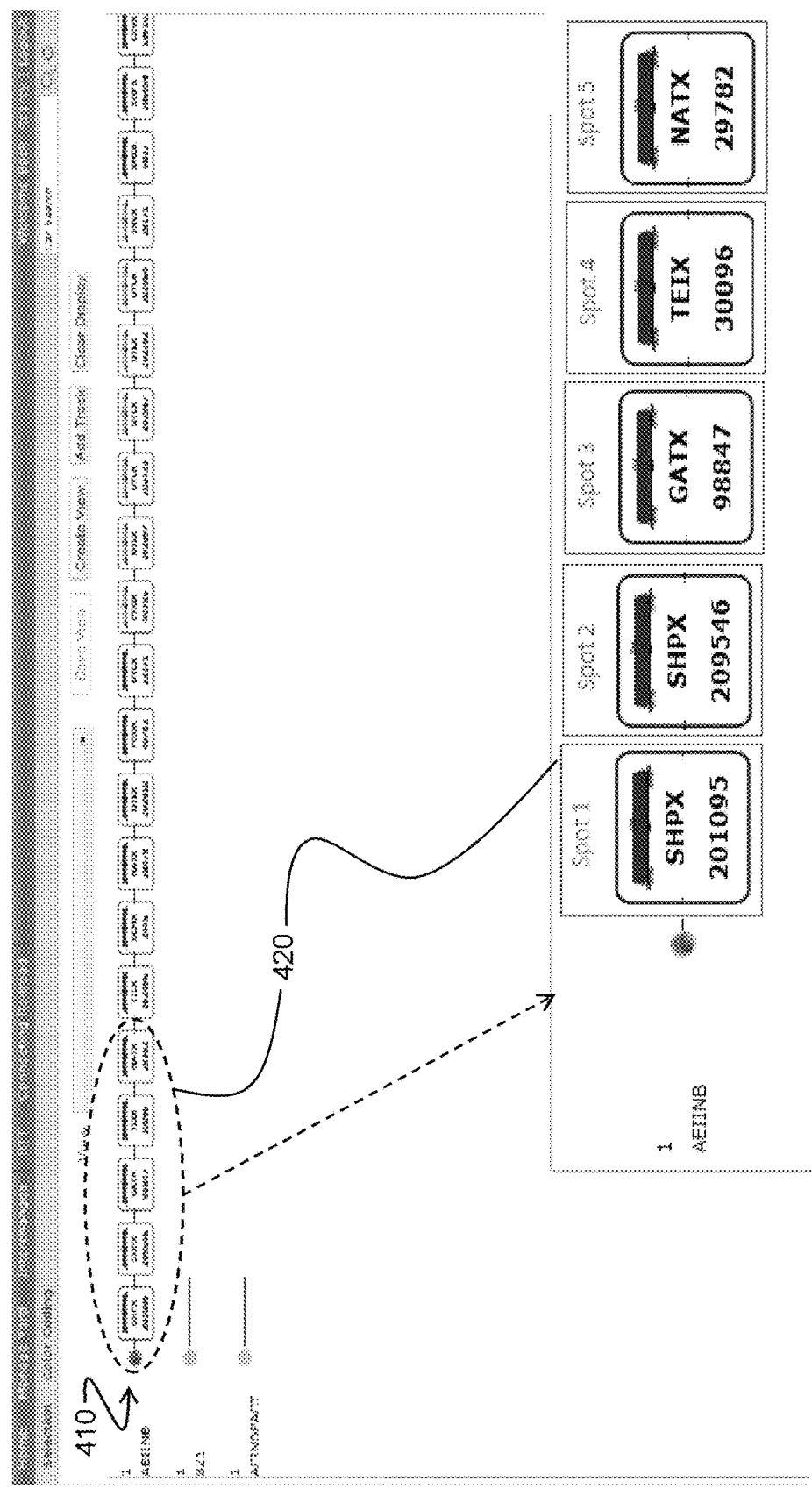
FIG. 4 illustrates an embodiment of a display screen of a plant view of a shipper/receiver facility generated by the system of FIG. 1.

FIG. 4 illustrates an embodiment of a displayed plant view 400 of the S/R facility provided by the system of FIG. 1. The plant view may be a graphic representation of a string 410 of vehicles and products on a route (e.g., a railway track with rail cars carrying storage containers on the track) in the S/R facility. The string shows the order of the vehicles (e.g., rail cars) as the vehicles appear on the route in relation to each other in various spots. However, the string may not indicate any particular geographic location(s). A portion 420 of the string 410 may be selectively enlarged for easier viewing in FIG. 4. Views may be created that contain graphical representations of the assets and products that the user works with or that the user works with most often, for example. This allows a user to more easily manage, for example, rail cars between railway tracks and storage areas. The plant view may be organized according to views that contain strings of vehicles and products specified by the user. A user may group strings together and switch between views by selecting from a "View" drop-down menu.

The system may be configured for a user to edit a view by adding or removing strings and clicking a "Save View" icon. For example, to create a new view, a user may click on a "Clear Display" icon to remove all strings from the window in the plant view. The user may then click the "Add Tracks" icon to select the strings that the user wants to view. The user may select from a list of storage areas that appear, and then click "Done". All strings associated with the selected storage areas will appear in the view. An individual string or storage area may be removed by right-clicking on the string or storage area name and selecting "Remove from this View". When a user is satisfied with a view, the user may click the "Create View" icon. A "New View" pop-up window will appear which may be named by the user. Again, the user may specify for the new view to be visible only to the user (My View) or to all users (Shared View).

Figure 5A:
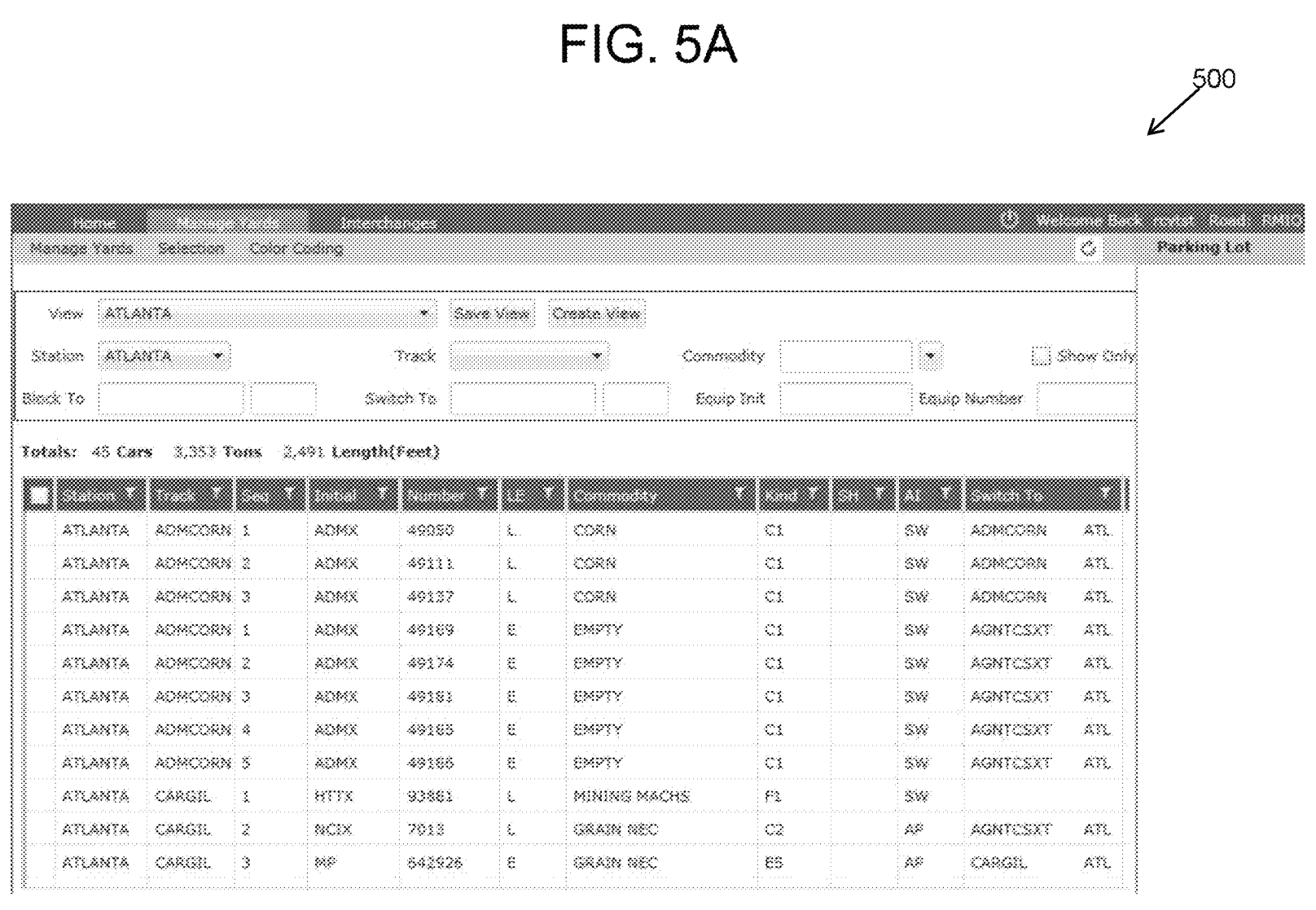
Figure 5B:
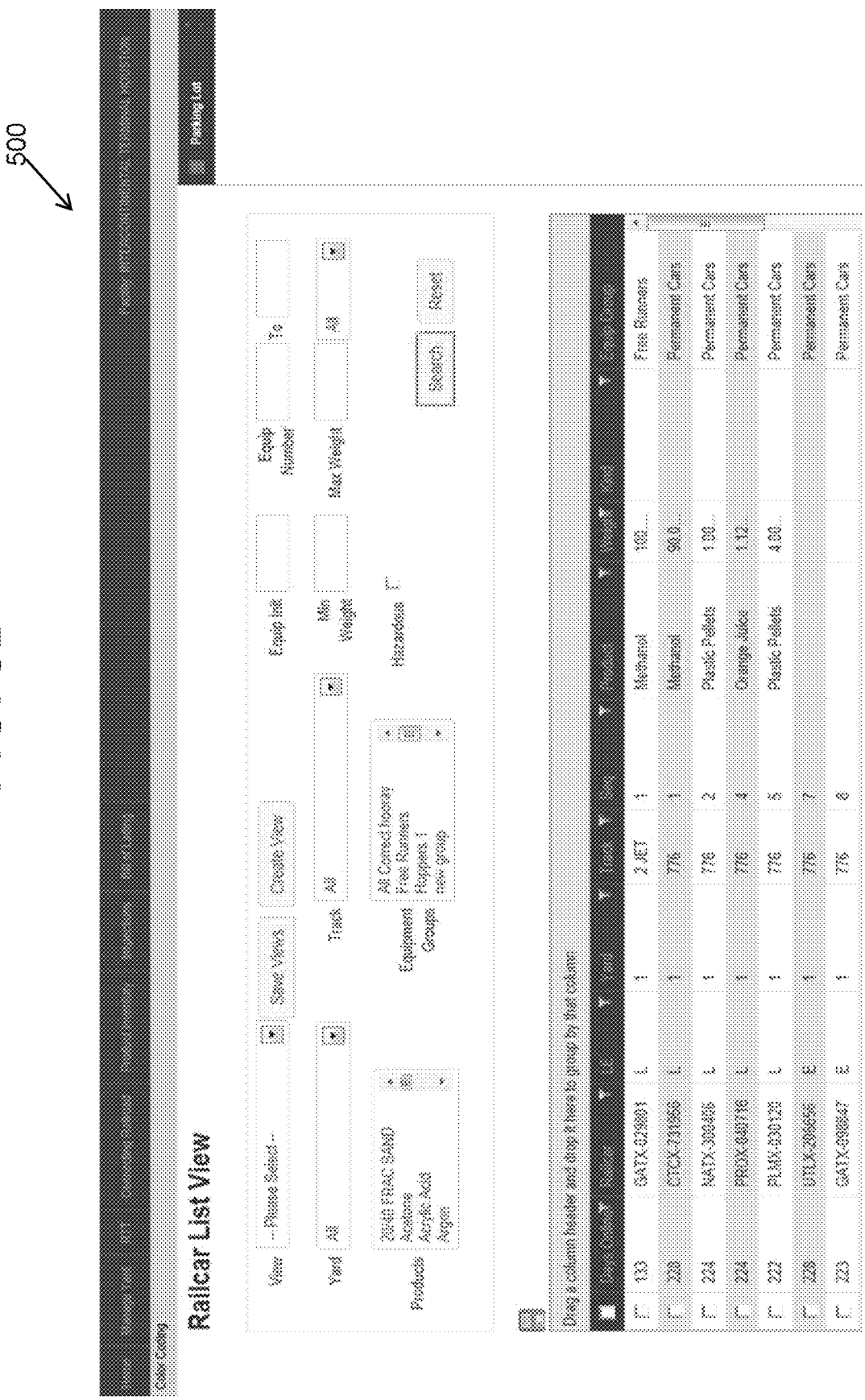

FIGS. 5A and 5B illustrate embodiments of a displayed list view 500 of the S/R facility provided by the system 100 of FIG. 1. The list view 500 may be a textual representation of vehicles and products in a plant. For example, shipping vehicles, tracks, and storage areas having product appear in a table format and views may be created that show the storage areas, shipping vehicles, and/or tracks that a user desires. The list view may be organized according to views that contain the vehicles and products specified by the user and allows a user to view the vehicles and products the user works with most often, for example. A user may switch between views by selecting from the "View" drop-down menu. A user may create a new list view by selecting "Clear Selection" from the "View" drop-down menu to remove, for example, all tracks and storage areas from the window, select the "Storage Area" and/or "Track" the user wants to view, and click on the "Create View" icon. A "New View" pop-up window will appear and, again, a user may specify a name and visibility of the new view. A user may click the "Update" icon causing, for example, all rail cars associated with a selected storage area and/or track to appear in the view.

Figure 6A:
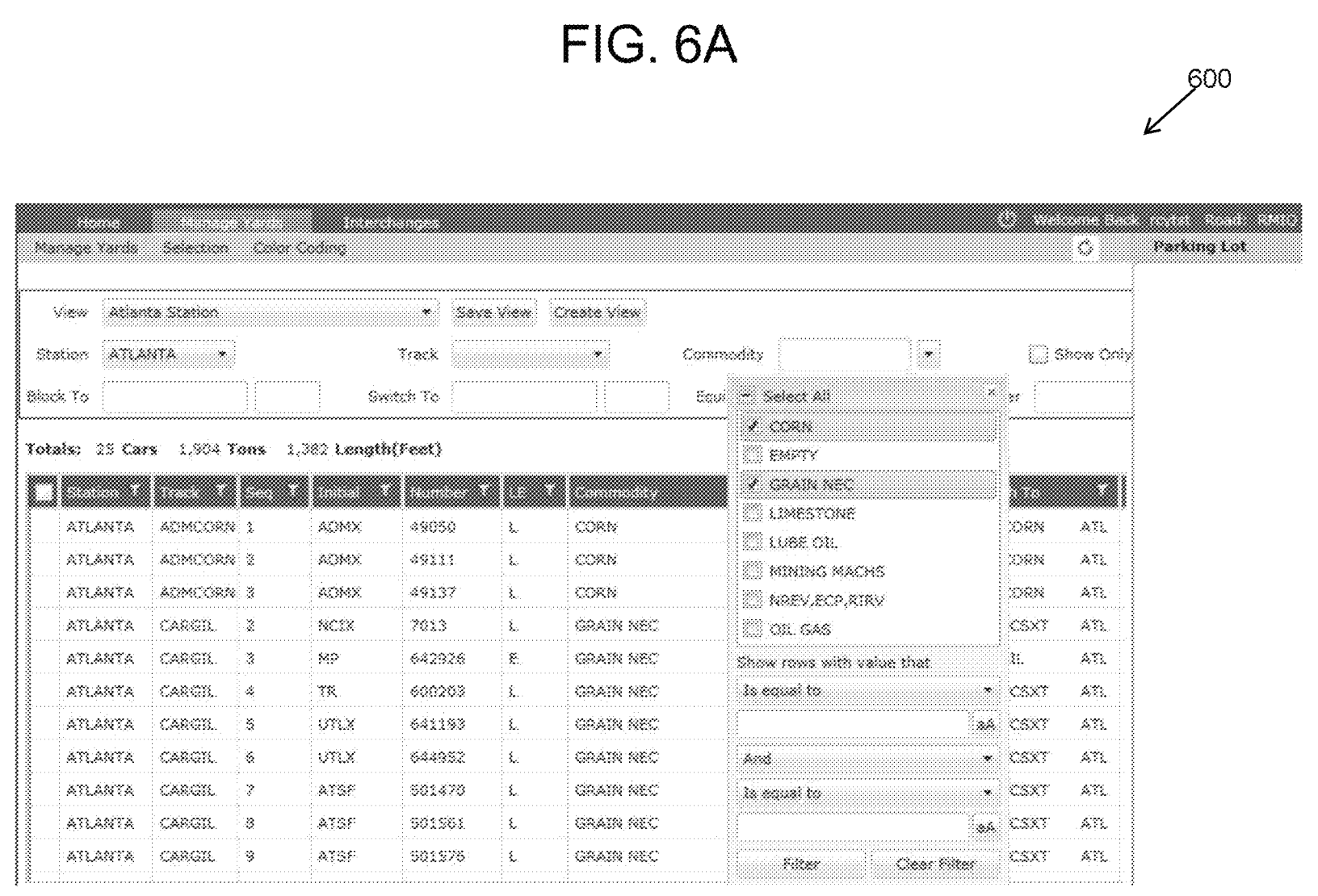
Figure 6B:
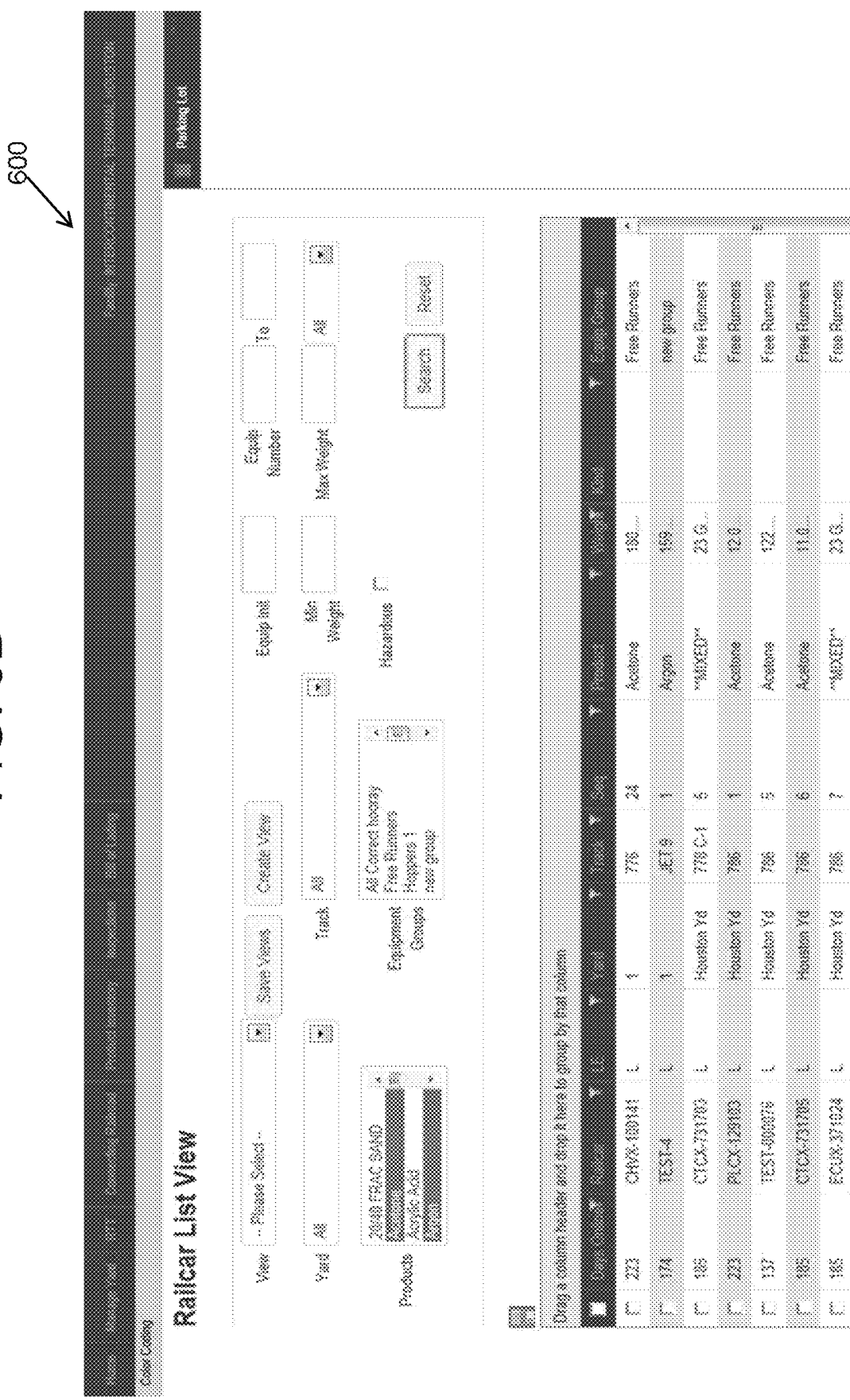

FIGS. 6A and 6B illustrate embodiments of a data sorting functionality 600 of the system 100, for sorting and filtering the data of the list view(s) of FIGS. 5A and 5B. In accordance with an embodiment, a user may sort the information of the vehicles and products in the list view by the values in any column. When a user clicks on a column header, the list may be sorted according to the information in that column. If a user clicks the column header again, the sort will change between ascending and descending order.

The system may be configured for a user to also filter the information of the vehicles and products that appear in the list view using the values in any column. For example, if a user clicks on a filter icon (e.g., displayed with the appearance of a funnel-like element), a pop-up window appears, and the user may select from the values appearing in the column or enter the values directly in the free-form fields. In addition to an "equal to" option, the free-form fields also provide a choice of filtering by values that do or do not begin with, end with, or contain a particular value. Once a user makes a selection, only vehicles and products that match the specified value(s) appear in the list.

Figure 7A:
FIGS. 7A and 7B illustrate embodiments of display screens showing the color coding of vehicles and products in the map view of FIGS. 2A and 2B.
Figure 7B:
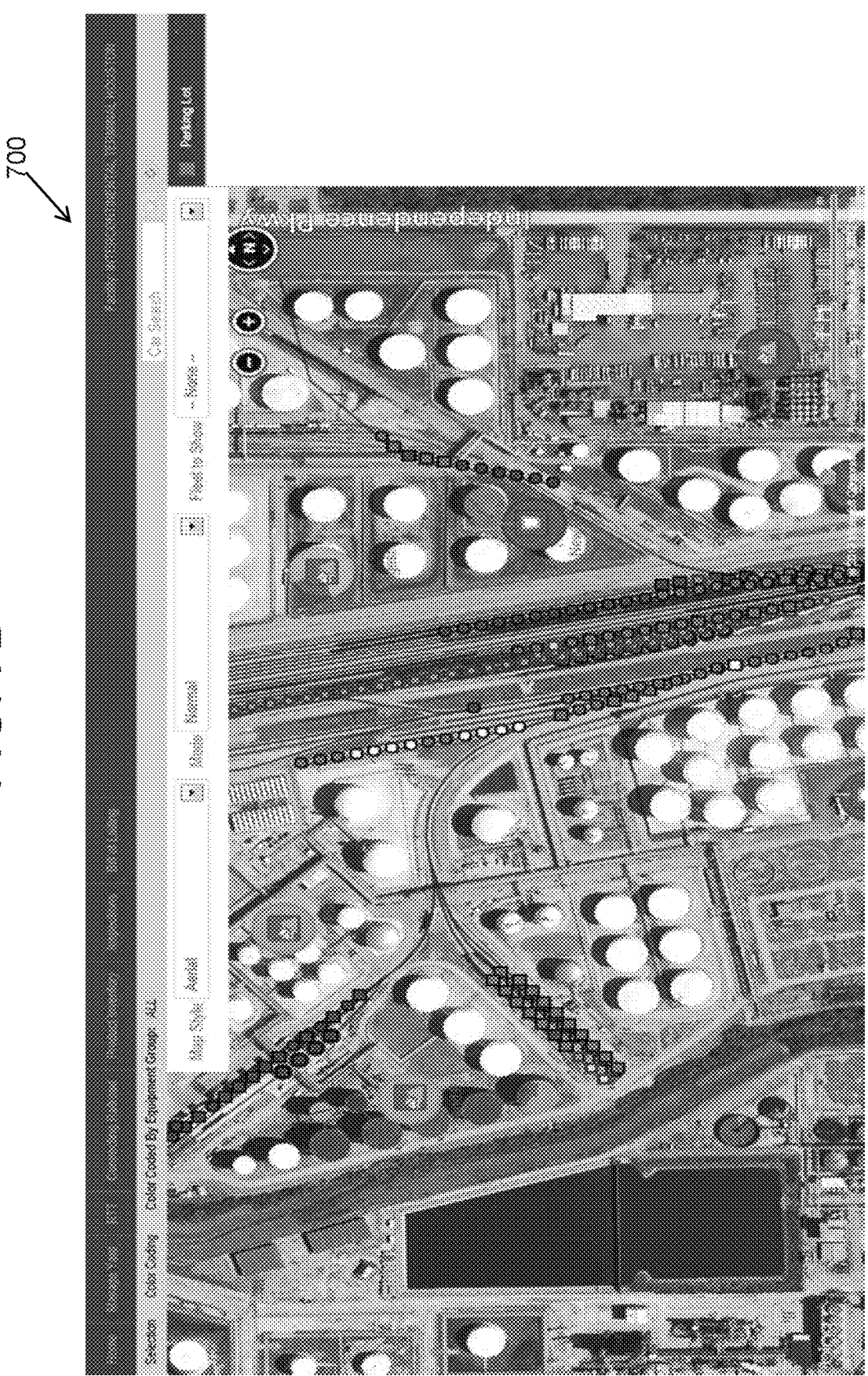
Figure 8:
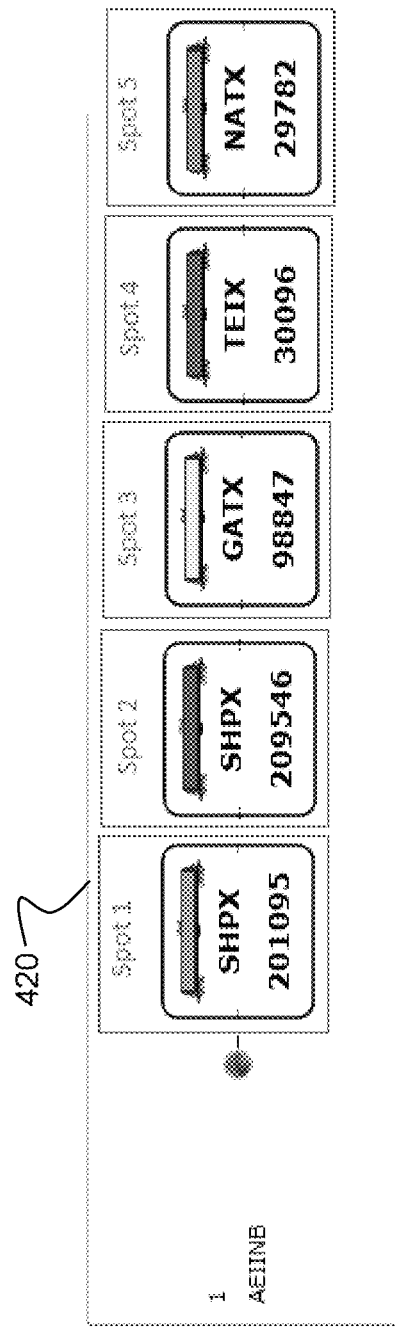
FIG. 8 illustrates an embodiment of a portion of the string of the display screen of FIG. 4, showing the color coding of the vehicles and products of the portion.
Figure 9A:
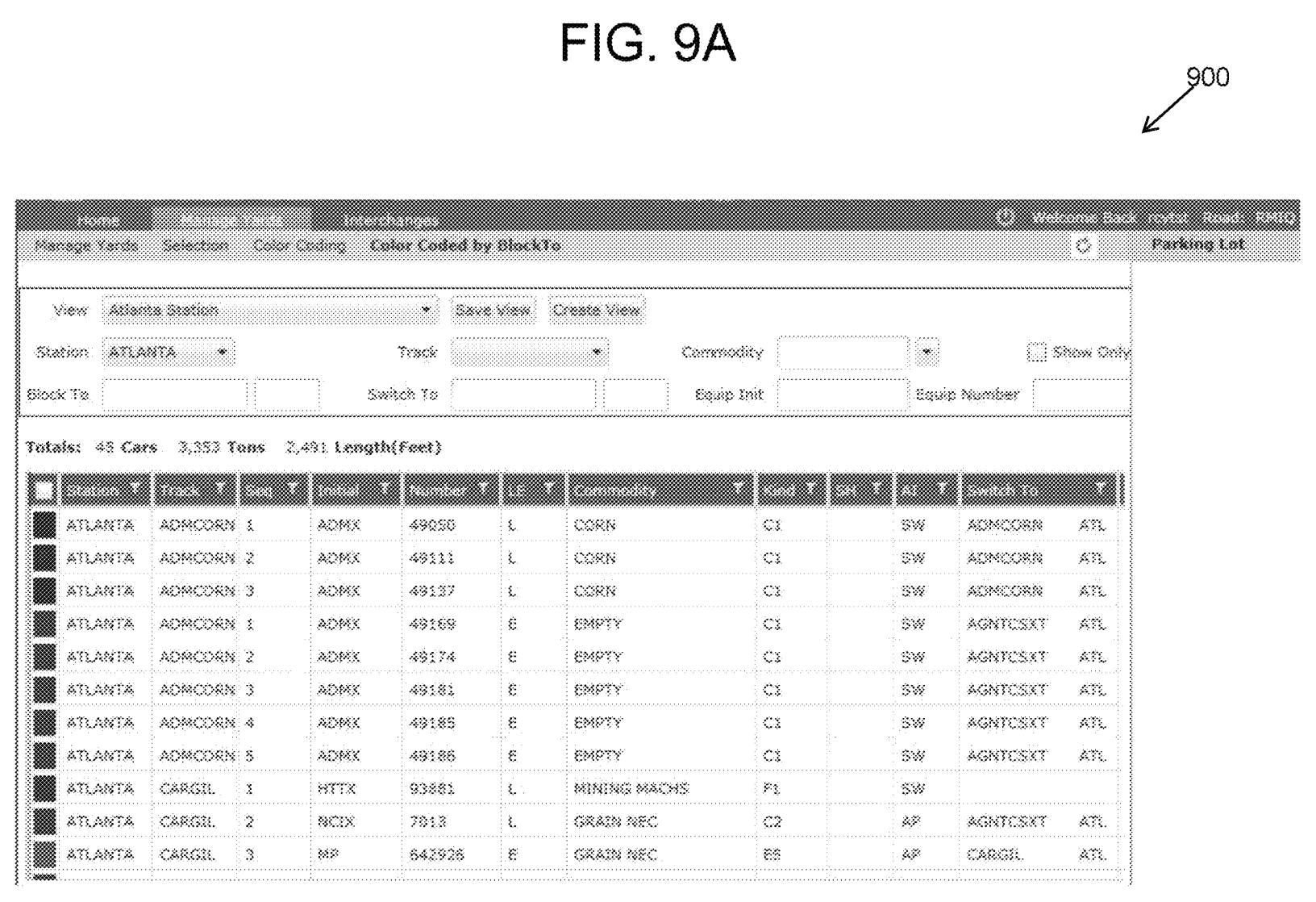
Figure 9B:

FIGS. 7A and 7B illustrate embodiments of display screens 700 of the system 100 showing the color coding of graphical representations of assets and products in the map view 200 of FIGS. 2A and 2B. Using a "Color Coding" option, a user may highlight, for example, graphical representations of vehicles or other transportation vehicles on any view by the following designations: "Equipment Group", "Car Kind", "Product", "Hazardous, or "Status". As a result, a user may find particular groups of vehicles quickly by selecting a designation from a "Color Coding" drop-down menu, causing the corresponding cars to appear highlighted in the view. The color-coded vehicles may be shown in the areas within the dashed white ovals in FIGS. 7A and 7B. Similarly, FIG. 8 illustrates an embodiment of a portion 420 of the string 410 of the displayed view 400 of FIG. 4, showing the color coding of the vehicles and products of the portion 420. FIGS. 9A and 9B illustrate an embodiment of a displayed view 900 showing the color coding of vehicles and products in the list view 500 of FIGS. 5A and 5B. FIGS. 3 and 7-9 herein illustrate the color coding in terms of shades of gray. However, in accordance with an embodiment, the color coding may be accomplished with other non-gray scale colors, providing better discernment to the user. Other types of vehicle and product coding may be possible as well such as, for example, shape coding of vehicle and product icons, intensity coding of vehicle and product icons, and flashing coding (e.g., a displayed icon is first displayed and then not displayed in a regular repeating pattern) of vehicle and product icons.

Figure 10A:
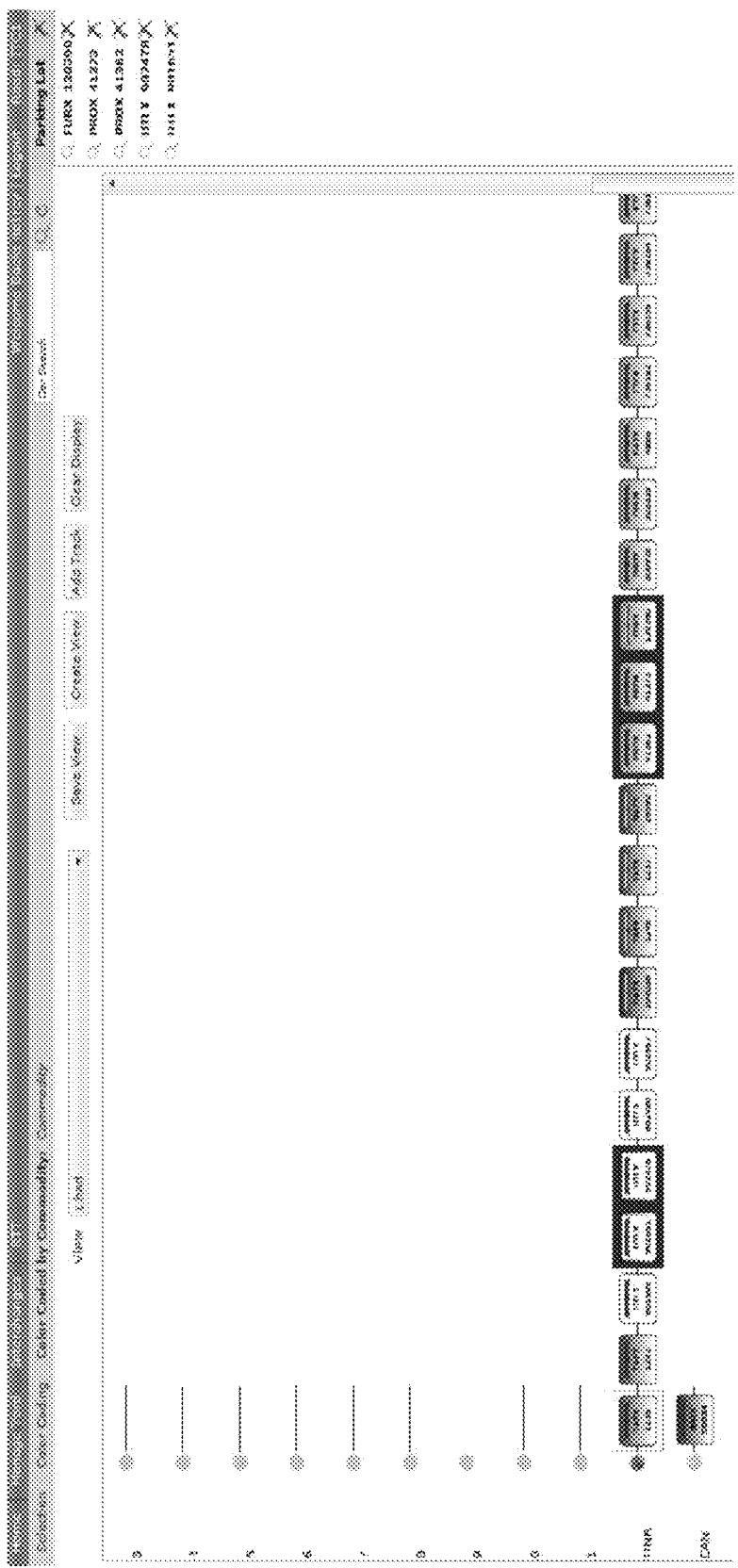
FIGS. 10A and 10B are embodiments of display screens showing a "parking lot" function.
Figure 10B:
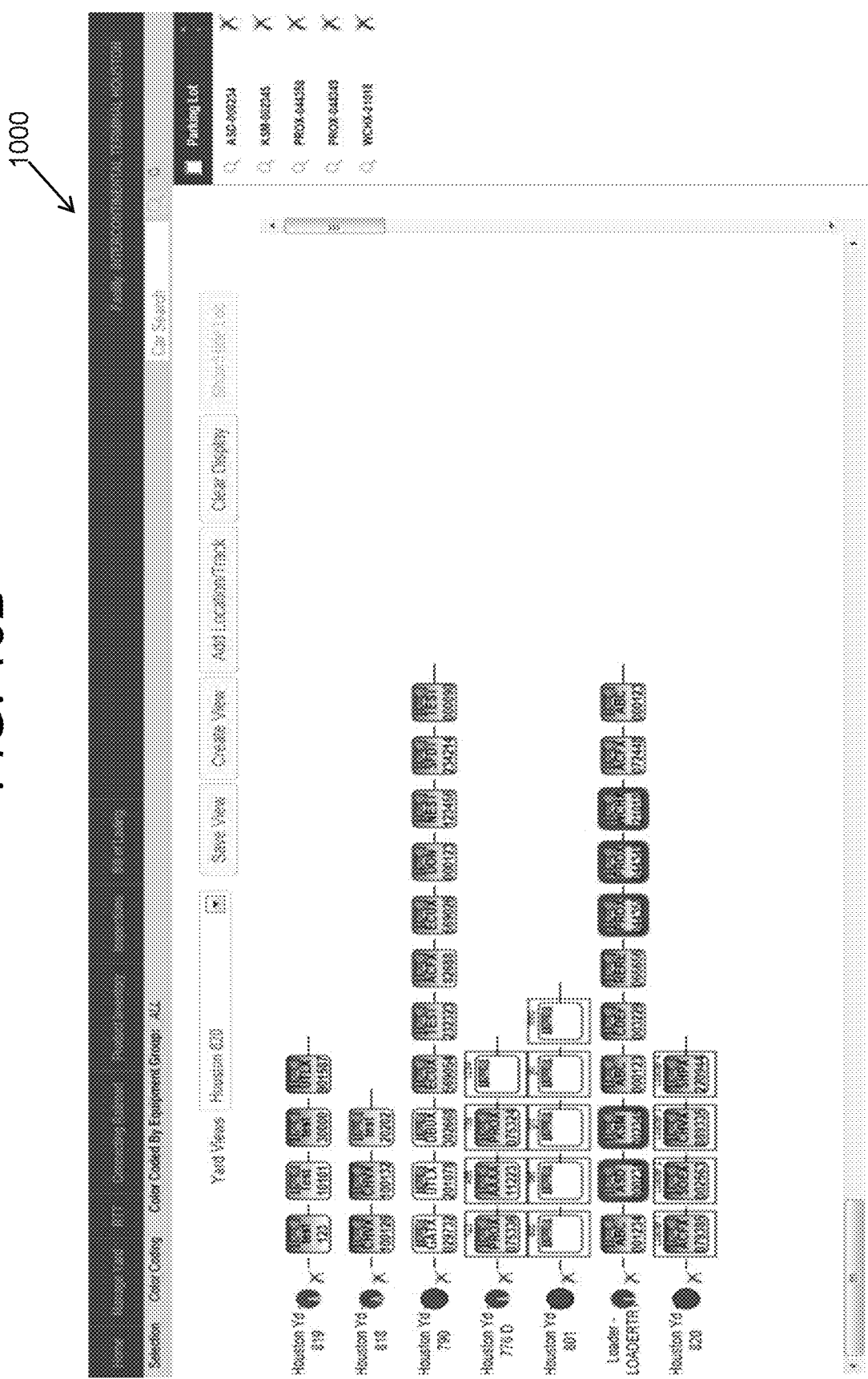

In accordance with an embodiment, the system may be configured for a user to select shipping vehicles in any view based on a variety of criteria including vehicle ID, location, Equipment Group, or Product, allowing a user to choose groups of vehicles quickly and act based on the criteria. A "parking lot" area or holding area may be provided in each view. For example, FIGS. 10A and 10B show embodiments of display screens of the system 100, which include a parking lot function. The parking lot function allows a user to temporarily place a group of graphical representations of vehicles (e.g., container-carrying vehicles and/or containers), with which the user wants to work, into a designated portion of the display (the "parking lot" area) where they may wait until the user is ready to act upon them. To place a graphical representation of a vehicle, or multiple vehicles (e.g., a string), in the parking lot area, a user may select the vehicle(s) and drag and drop the vehicle(s) to the parking lot area in the window. In one embodiment, moving a vehicle to the parking lot area does not make any changes to the vehicle in the system. However, once a group of vehicles are placed in the parking lot area, a user may readily select the entire group and edit the corresponding Bill of Lading information or move the group of vehicles together within the representation of the S/R facility within the system 100. The user may then work with several vehicles that may be currently on different tracks or paths, or when the user wants to add multiple vehicles to a consist, for example. Optionally, moving a graphical representation of one or more vehicles results in the controller generating control signals to the vehicles to direct the vehicles to automatically move between corresponding locations as indicated by the user with the controller.

In accordance with an embodiment, the system 100 may be configured for a user to select a "Display Mode" check box to make the parking lot area disappear from the displayed window in the map view. This provides the user with more room to work in the view. Furthermore, when in the "Display Mode", the system may update automatically or be manually refreshed to provide the up-to-date information to the user. The user may draw and edit tracks and storage areas such that the map view will match the setup of the plant operation.

Figure 11:
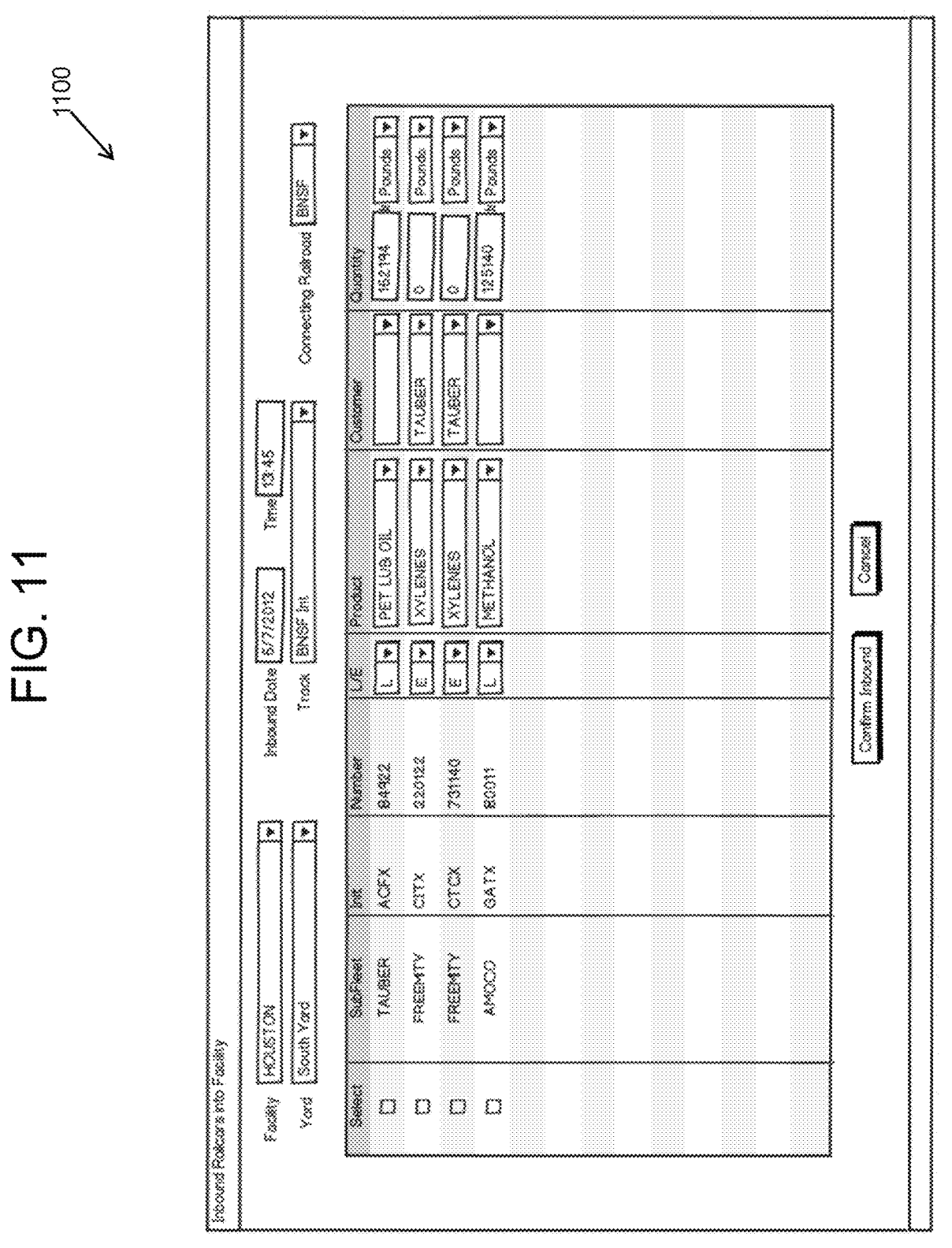

FIG. 11 illustrates an embodiment of a display screen 1100 generated by the system of FIG. 1 showing information associated with providing interchange support of vehicles (e.g., inbound rail cars) into the S/R facility. For example, the displayed information may include header information of facility, yard, date and time, track (or road or other route), connecting railroad or other connecting shipper, and so on, plus a selectable list of incoming vehicles (e.g., rail cars) that includes displayed information of subfleet, asset identifier ("Number"), information of what the vehicles are carrying, and quantities of what the vehicles are carrying. As part of the user interface, the display screen may include options for a user to modify the information of the incoming vehicles, confirm the incoming vehicles, or cancellation of any modifying actions.

Figure 12:
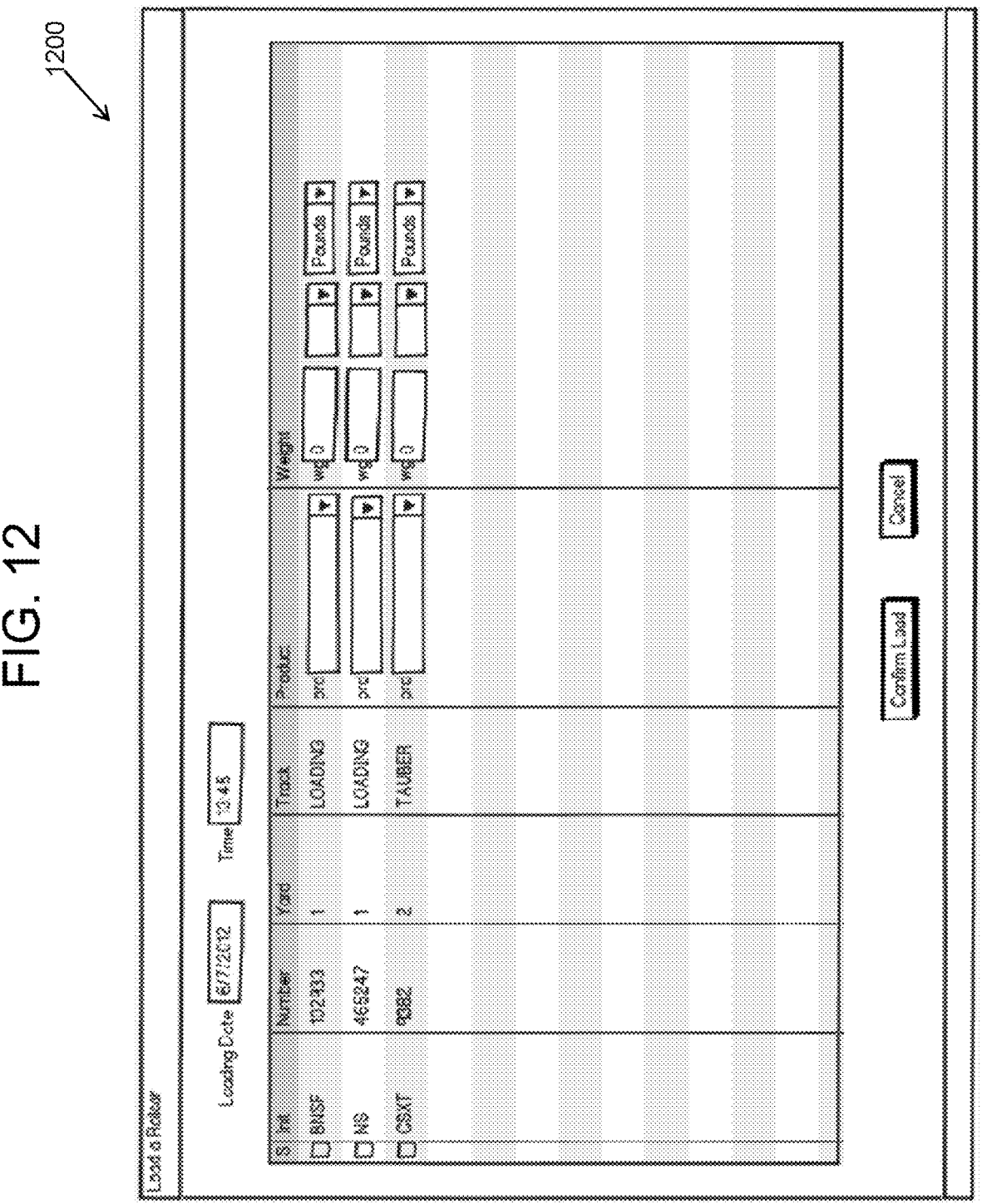
FIG. 12 illustrates an embodiment of a display screen generated by the system of FIG. 1 showing information associated with loading a vehicle within the S/R facility.

FIG. 12 illustrates an embodiment of a display screen 1200 generated by the system of FIG. 1 showing information associated with loading a vehicle (e.g., a railcar) within the S/R facility. For example, the display screen may include a loading date and time in the header, and a list of vehicles that are to be loaded, or that are being loaded, at or around that time/date. Displayed information of the vehicles may include vehicle number or other vehicle identifier, owner or shipper information, route information of where the vehicle is currently, or where the vehicle is to be loaded, and modifiable information of products (e.g., type of product and weight or mass of product) being loaded (or to be loaded) onto the vehicles.

Figure 13:
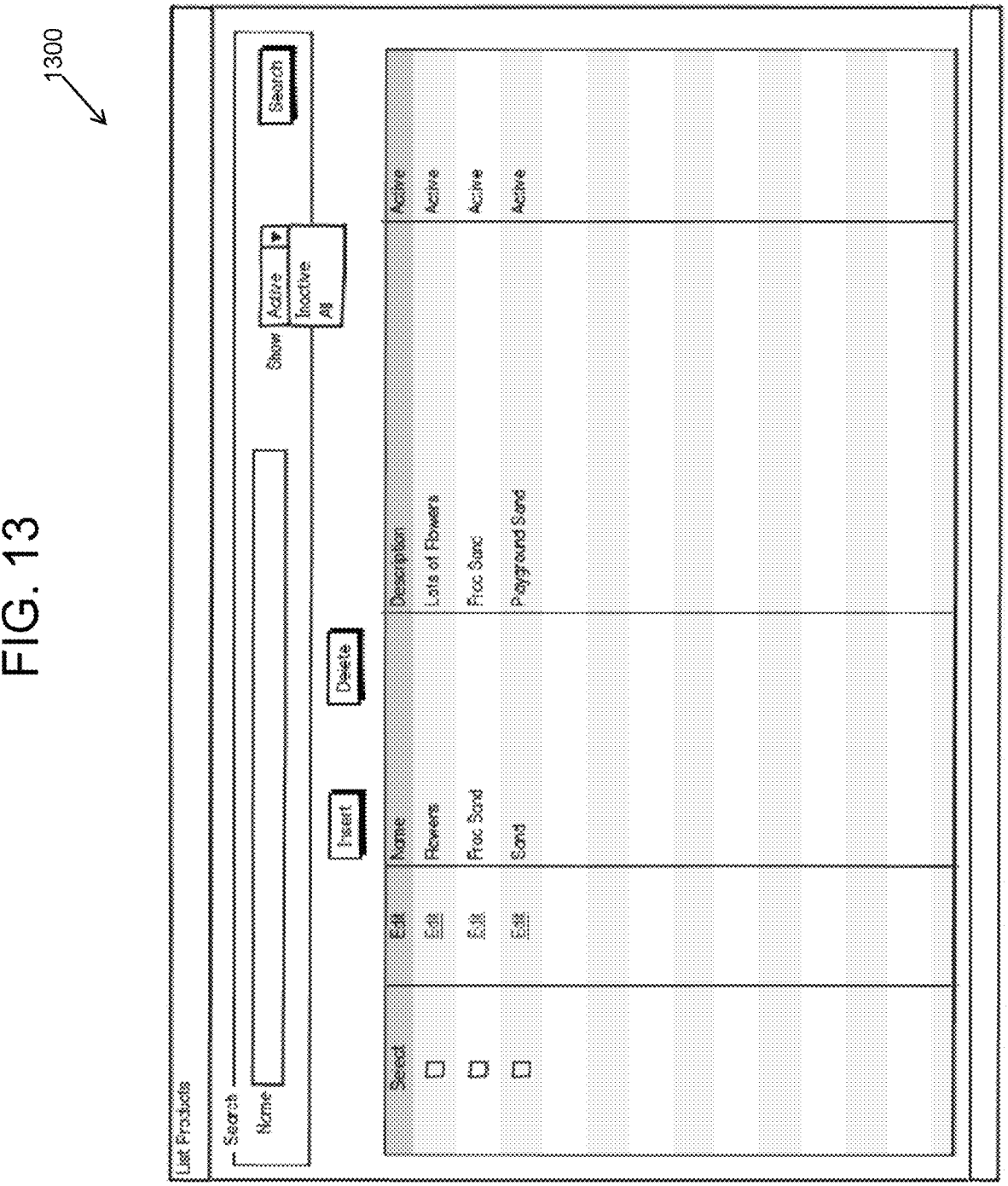
FIG. 13 illustrates an embodiment of a display screen generated by the system of FIG. 1 showing information associated with a product master list.

FIG. 13 illustrates an embodiment of a display screen 1300 generated by the system of FIG. 1 showing information associated with a product master list. For example, the product master list may be a displayed list of product information stored in a database (and associable with vehicles in others of the displayed screens—see FIGS. 11 and 12 for example), which can be modified via insertion of new products, deletion of existing products, and selection and modification of individual ones of the products, in terms of information about the product such as product name, product description, and whether the product is designated as inactive or active in the system (active meaning currently associable with vehicles, and inactive meaning not currently associable with vehicles).

FIG. 14 illustrates an embodiment of a display screen 1400 generated by the system of FIG. 1 showing information associated with an equipment group master list. For example, the equipment group master list may be a displayed list of equipment group information stored in a database (and associable with vehicles in others of the displayed screens), which can be modified via insertion of new equipment groups, deletion of existing equipment groups, and selection and modification of individual ones of the equipment groups, in terms of information about the equipment groups such as equipment group name and whether the equipment group is designated as inactive or active in the system.

FIG. 15 illustrates an embodiment of a display screen 1500 generated by the system of FIG. 1 showing information associated with an equipment kind master list. For example, the equipment kind master list may be a displayed list of equipment kind information stored in a database (and associable with vehicles and/or equipment groups in others of the displayed screens), which can be modified via insertion of new equipment kinds, deletion of existing equipment kinds, and selection and modification of individual ones of the equipment kinds, in terms of information about the equipment kinds such as equipment kind abbreviation, equipment kind description, and whether the equipment kind is designated as inactive or active in the system.

FIG. 16 illustrates an embodiment of a display screen 1600 generated by the system of FIG. 1 showing information associated with a location (e.g., storage area) master list. For example, the location master list may include, as part of the displayed user interface, user-editable fields for access and modification of associated data records stored in the system. The fields (and associated data record entries) may include location area, location name, location description, location type, location capacity (minimum and/or maximum capacity of what is stored at the location), designated unit of measure of the capacity, customer, and product.

Figure 17:
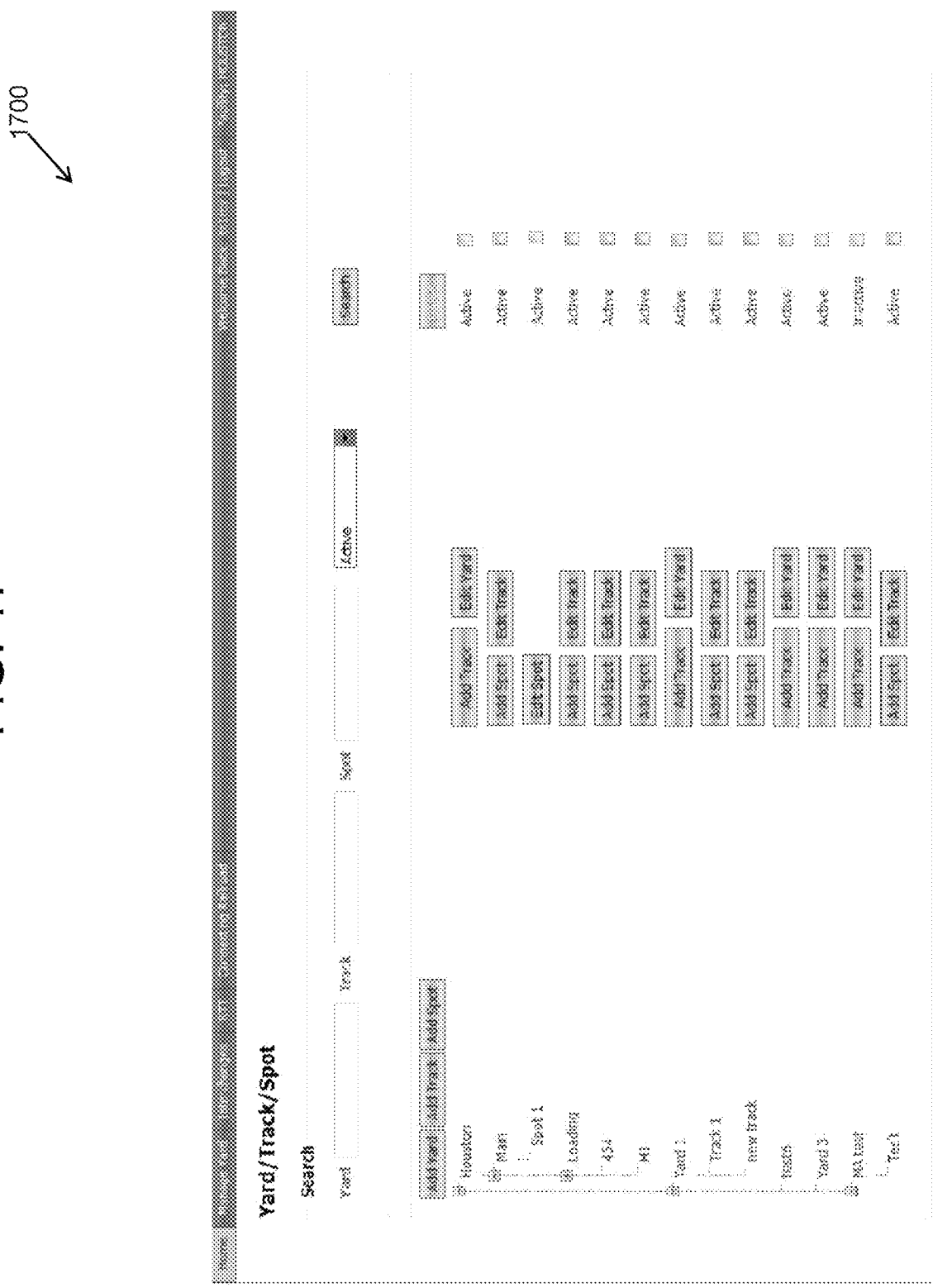
FIG. 17 illustrates an embodiment of a display screen generated by the system of FIG. 1 for the setup of infrastructure (e.g., a plant/track/spot) within the S/R facility.

FIG. 17 illustrates an embodiment of a display screen 1700 generated by the system of FIG. 1 for the setup of infrastructure (e.g., a plant, a track, and/or a spot) within the S/R facility. For example, the display screen may include, as part of the displayed user interface, search fields for user entry of infrastructure information to search for in the system (e.g., search by yard, track, or spot), a display of existing infrastructure (e.g., displayed as a nested hierarchy of infrastructure), user-selectable icons for adding or editing infrastructure elements, and user-selectable icons (e.g., check boxes or radio buttons) for activating and inactivating the infrastructure elements.

Figure 18:
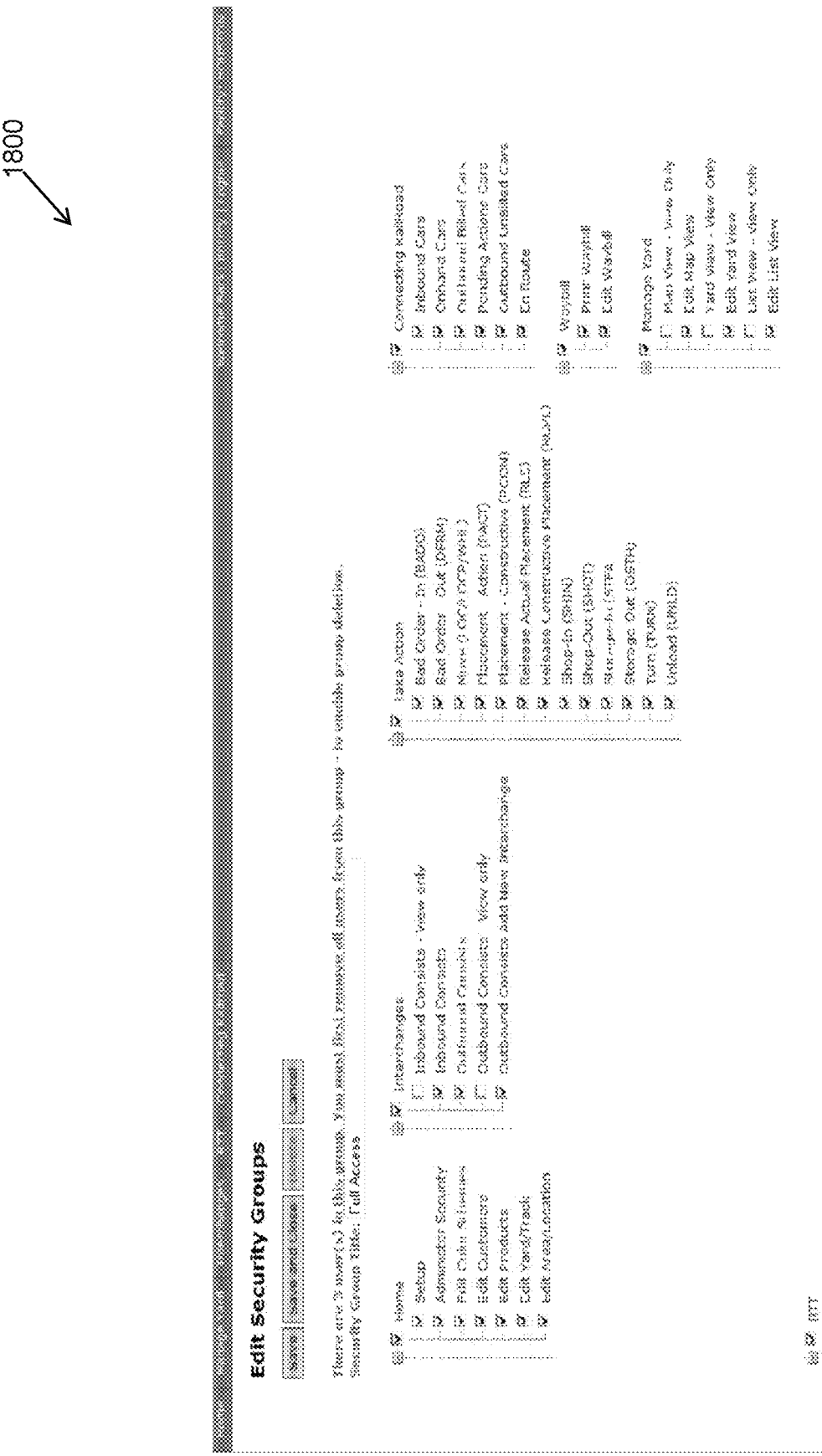
FIG. 18 illustrates an embodiment of a display screen generated by the system of FIG. 1 for security and user setup.

FIG. 18 illustrates an embodiment of a display screen 1800 generated by the system of FIG. 1 for security and user setup. For example, the display screen may include, as part of the displayed user interface, user-selectable options for allowing respective users in one or more designated groups of users to access (or not access) the various functions of the system.

Figure 19:
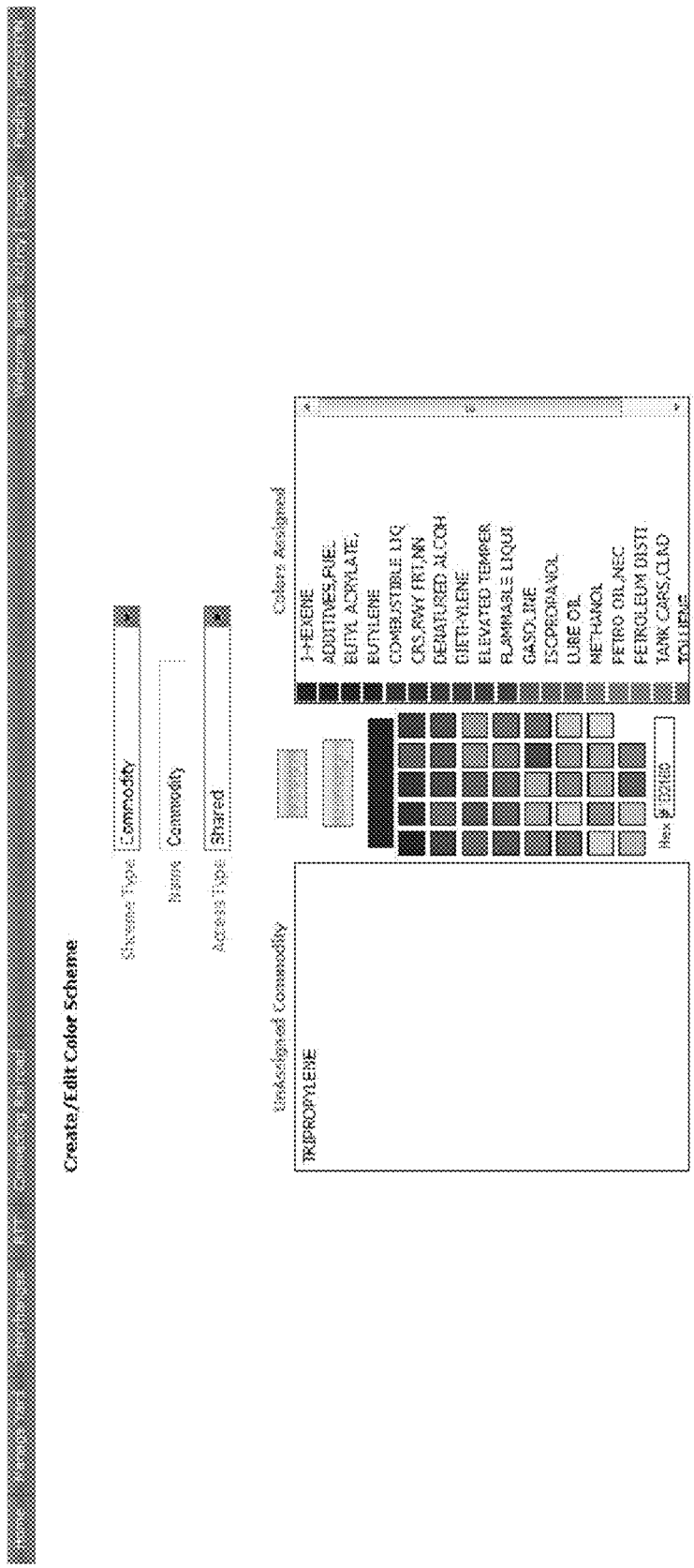
FIG. 19 illustrates an embodiment of a display screen generated by the system of FIG. 1 for a color scheme setup.

FIG. 19 illustrates an embodiment of a display screen 1900 generated by the system of FIG. 1 for a color scheme setup of the system. For example, the display screen may include, as part of the displayed user interface, one or more user selectable and/or editable fields for selecting a color scheme type (e.g., each color scheme type may be associated with a particular group of vehicles, type of product carried on vehicles, or the like, and for assigning various colors to members of the color scheme type). For example, for each product in the system, the system may be configured for a user to assign a color that is uniquely associated with that product in the system.

In accordance with an embodiment, the controller and the user device may be operable to facilitate the modification of a graphical representation of the S/R facility displayed on a display screen of the user device, facilitate the modification of characteristics of graphical representations of products and vehicles located within the S/R facility which may be displayed on the display screen of the user device, and facilitate the movement of graphical representations of products and vehicles within the S/R facility on the display screen of the user device as commanded by the user, including the loading and unloading of products onto and off of vehicles. The graphical representations and movements may correspond to actual facilities, products, assets, and the actual characteristics and movements of those products and vehicles in the real world. The modification of a graphical representation of the S/R facility may include adding or deleting graphical representations of routes or storage areas within the facility. The modification of graphical representations of products and vehicles may include color coding the virtual products and vehicles. The modification of graphical representations or products and vehicles may include assigning characteristics to the products and vehicles.

Although trains of rail cars are referred to herein in reference to certain embodiments, certain other embodiments may apply to vehicle consists more generally. A vehicle consist is a group of vehicles that are mechanically and/or logically linked together to travel along a route. A rail vehicle consist is one example of a vehicle consist, and a train (e.g., having one or more locomotives for propulsion and one or more rail cars for carrying products and/or passengers and not configured for propulsion) is one example of a rail vehicle consist. Another example of a rail vehicle consist is a set of mining ore carts. Vehicles may be logically linked together to travel along a route when the vehicles are not mechanically coupled but communicate with each other to coordinate the separate movements of the vehicles with each other (resulting in the vehicles moving together along the route). A powered vehicle consist refers to the interaction of two or more powered vehicles that may be mechanically, informationally, or otherwise linked together, as may be the case for a locomotive consist (having multiple locomotives to move a train including the locomotives and one or more unpowered rail cars or other unpowered vehicles).

In one embodiment, the system may record vehicle and product movement events within the S/R facility. When an actual vehicle or product moves in an actual S/R facility, a user of the system may update the system to reflect the move. This may be done, for example, by "dragging and dropping" the icon corresponding to the vehicle or product in a view displayed on the user device. Vehicles and products may come into the S/R facility through an inbound interchange process. In embodiments, the system is configured so that a user cannot move, place, release, load, or unload vehicles or products in the system until the vehicles or products are interchanged to the S/R facility. Vehicles and products stay within the S/R facility until a user moves them to a serving carrier through an outbound interchange.

Using the system, simple route-to-route moves may be made within facility limits. Also, "Classifying" a route provides a way to rapidly move cars and create history records in a large facility, for example. Furthermore, "Fanning" a track allows a user to move cars from one track to multiple other routes within a facility. Also, "Resequencing" allows a user to change the order of vehicles on a route. In accordance with an embodiment, the "Classifying", "Fanning", and "Resequencing" functions are implemented as scripts or macros in the system. Other scripts or macros can be used to automate or aggregate a series of steps that are repeated and therefore to collapse longer routines into a single action (or the equivalent).

In the system, several move types related to storage are defined that allow a user to move a vehicle or product into and out of storage, may be recorded to movement history, and may be used to generate storage billing. Several move types may be provided for recording when a vehicle or product may be defective and in need of repair or replenishing. For example, vehicles and/or containers may be marked as "bad order" in the system and may be flagged on various windows and reports throughout the system. When the car is repaired, the car may be moved in the system off the "bad order" list. Each time a car is moved by a user in the system, a record of the move may be written to a car movement history file which may be accessed. A user input into the controller that classifies a vehicle as defective, in need of repair, or in need of inspection may cause the controller to generate a control signal that is communicated to another location or device to automatically schedule or order the repair and/or inspection of the vehicle.

The controller and associated management software application 115 may include logic that provides an assessment, in comparison to one or more designated criteria, of the movement of vehicles and products in the system as initiated by a user. For example, there may be some vehicle movements that may be impossible, highly improbable, or unlikely to take place in a facility. If a user attempts to make such a movement of a vehicle in the system, the system may disallow the move or at least provide an indication to the user that the move may be highly unusual and suggest that the user may want to reconsider the move. Furthermore, movement of vehicles and products within the system made by a user may be verified, for example, against data collected within the actual facility corresponding to the actual movement of the vehicles or products, e.g., RFID data or optical character recognition (OCR) data. The actual movement of vehicles and products in the facility may also be time stamped, allowing the system to perform efficiency analysis of the movement of vehicles and products through the S/R facility.

In accordance with an embodiment, the system allows a user to review and edit shipping and receiving information for any vehicle and associated product. For example, basic shipping/receiving information (e.g., Bill of Lading or waybill information) for a car or other vehicle may appear on the screen when a user, for example, hovers a cursor over that car on the display screen. The S/R information may be edited by right-clicking on the car and selecting "Edit S/R Information", for example. Data may then be edited and/or added via a pop-up window. In accordance with an embodiment, data fields include "Customer", "Equipment Group", "Product", "Quantity" and "Seals". Other S/R data fields (e.g., load vehicles, unload vehicles, associate with an order, outbound vehicles, and inspections) may be possible as well, in accordance with various embodiments of the inventive subject matter.

In accordance with an embodiment, the system allows a user to periodically review consists delivered to the S/R facility. When the user sees a new inbound consist listed, the user may check the vehicles on that consist and plan for interchanging and switching vehicles as they may be received. Vehicles of an inbound consist may be officially accepted by the user and moved into inventory in the S/R facility. Vehicles cannot be moved in the system until the user interchanges them online, however. After vehicles may be accepted from a consist, the vehicles may be managed automatically or manually via the system. When a user is ready to deliver vehicles from the S/R facility, a user may transmit the outbound consists in advance of actual delivery or transmit the outbound consists at the time of delivery. Once an outbound interchange is delivered, the vehicles may be tracked and managed along the route to the destination facility.

In one embodiment, the user device has functionality to determine its own location, the current time, and to identify a nearby vehicle or product via, for example, near field RFID, barcode scanning, manual entry, OCR, or the like. This allows a user to update the system with a vehicle or product location at a particular time. The system may then compare the gathered information against an assumed location of the vehicle or product. Alternatively, using the location of the user device and the assumed location of the vehicle or product, the system may guide a user to the vehicle or product.

The system may indicate certain paths, track sections, or storage areas that may be occupied, or will be occupied, or may be closed (e.g., for repair). The system may then calculate a path from the current location to a user indicated new location that avoids the unavailable segments of the routes. That path may be checked against the path or route sections that may be unavailable or may be unavailable during the time such a move of the vehicle or product may be intended. In one aspect, the path of travel may be indicated on the user device, and the path may be re-drawn by user input and/or by other rules or constraints applied by the user.

Another method may facilitate inventory and workflow management. The method may include various aspects using a controller, such as receiving one or more product locations of one or more products within a facility, receiving one or more locations of one or more vehicles within the facility, receiving an order for at least one of the one or more products, assigning at least a portion of the at least one of the one or more products to at least one of the one or more vehicles to complete the order, and scheduling a fulfillment of the order based one or more workflow times associated with one or more tasks. The one or more tasks may include one or more of receiving, inspecting, cleaning, repairing, maintaining, moving, loading, unloading, transferring, and testing of the one or more products or the one or more vehicles. A map of the facility may be generated that includes representations of the one or more products at the one or more product locations (the one or more vehicles at the one or more vehicle locations, and one or more locations associated with the order), and/or visually representing the map with respective visual characteristics on a display screen of a user device in operative communication with the controller. An order status update may be received that is based at least in part on the tasks. The map may be updated based on the order status update. A production schedule may be determined for the one or more products based on at least the fulfillment and the order, and/or releasing the at least one of the one or more vehicles for transport based on the fulfillment. One or more production schedules may be further based on a customer schedule. An order status update based on the one or more tasks may be received, and an alert may be given in response to the order status update.

The controller may receive a product inventory including one or more products at a facility, receive a vehicle inventory including one or more vehicles at the facility, receive a set of orders including one or more product orders, and one or more statuses associated respectively with the one or more product orders (wherein the statuses include location information describing at least one location associated with the one or more products and the one or more assets). The controller may provide a virtual representation of at least a map of the facility including the location information to be displayed on a user device and may produce a notification based on the location information that prompts one or more tasks related to the set of orders. In one embodiment, the controller may modify the product inventory based on the set of orders and schedule an inventory replenishment based on the set of orders. In alternative or complementary embodiments, the controller may calculate a total storage capacity of at least a subset of the vehicle inventory and may calculate an available capacity of at least the subset of the vehicle inventory, wherein the inventory replenishment may be further based on at least one of the total capacity and the available capacity. In addition, the controller may calculate a fulfillment rate based on at least the set of orders, and/or to schedule a downtime associated with at least a portion of the facility based on the set of orders.

The system may include an enterprise resource planning system, a controller, and a user device. The enterprise resource planning system may schedule an order to be fulfilled from an inventory at a facility. The controller may be associated with the facility and may be communicatively linked to the enterprise resource planning system and may allocate the inventory to a plurality of vehicles at the facility based at least in part on the order. The user device may be communicatively linked to the controller and may receive from the facility management controller a workflow list based on the order. In addition, the workflow list may include at least one task that completes the order by causing a portion of the inventory for the order to ship to a customer, and/or at least one task that replenishes the inventory based on at least the order. The user device may transmit an update to the workflow list based on activity that modifies at least one of an order status or an inventory status, and/or the enterprise resource planning system may schedule a subsequent order based on a fulfillment time associated with the order. In addition, the controller may schedule repositioning of at least a portion of the inventory or at least one of the plurality of vehicles based on the order.

In one embodiment, a system includes a controller operable to provide selectable options to a user for managing at least one of products or vehicles within a first shipper/receiver (S/R) facility and to control generation of displayed graphical representations of the first S/R facility, the at least one of products or vehicles within the first S/R facility, and one or more characteristics of the at least one of products or vehicles. The controller also is operable to receive input from the user to move at least one of the displayed graphical representations of the products or the vehicles to indicate one or more of moving the one or more of the products or the vehicles into storage, moving the one or more of the products or the vehicles out of the storage, repair of the one or more of the products or the vehicles, or replenishing the one or more of the products or the vehicles. The controller is operable to compare the input from the user with one or more designated criteria to determine whether the move, the repair, or the replenishment of the one or more products or the vehicles that is input by the user is possible in the first S/R facility and, responsive to determining that the move, the repair, or the replenishment of the one or more products or the vehicles that is input by the user is not possible, provide an indication to the user that the move, the repair, or the replenishment of the one or more products or the vehicles that is input from the user is not possible.

The displayed graphical representations can include a representation of at least one of the vehicles. The controller can be configured to receive user input that indicates a move of the representation of the at least one of the vehicles within the first S/R facility. The controller also can be configured to, responsive to receiving the user input and to communicate a control signal to the at least one of the vehicles to direct autonomous movement of the at least one of the vehicles according to the user input.

The controller may be further operable to control generation of the displayed representations of the at least one of products or vehicles en route between the first S/R facility and a second S/R facility. The controller can be further operable to calculate an arrival time of the at least one of products or vehicles to the first S/R facility based on one or more of a previous travel time, a weather condition, a road or track condition, or vehicle health.

The one or more characteristics of the at least one of products or vehicles may include one or more of vehicle container type, weight information, or vehicle load status. The selectable options can include one or more of an option for selecting a storage area for one or more of the products or the vehicles or an option for color coding displayed information about one or more of the products or the vehicles.

The displayed graphical representation of the first S/R facility can include an aerial view of at least one of a map of the first S/R facility or an aerial photographic view of the first S/R facility. The aerial view can include plural vehicle routes of the first S/R facility and one or more buildings of the S/R facility. The controller can be operable to control generation of positions of the displayed graphical representations of the vehicles relative to the plural vehicle routes and the one or more buildings.

Optionally, the displayed graphical representations of the vehicles can be icons. Fr each vehicle of the vehicles, the controller can be operable to control the generation of the displayed graphical representation of the one or more characteristics of the vehicle when the user selects the icon corresponding to the vehicle. The displayed graphical representation of the one or more characteristics can include at least one of text or pictorial information of the vehicle.

The displayed graphical representations of the vehicles relative to the plural vehicle routes can include locations of the vehicles along the plural vehicle routes. The controller can be operable to determine the locations of the vehicles based on received information about the vehicles.

The system also can include at least one sensor disposed in the first S/R facility and configured to automatically determine the locations of the vehicles. The sensor or other component (e.g., a processor operatively coupled with the sensor) can generate the information about the vehicles, indicative of the locations of the vehicles, for communication to the controller.

The controller may be further configured to determine dwell times of the vehicles based at least in part of the information received from the at least one sensor, and to automatically control pre-blocking of containers on the vehicles based at least in part on the dwell times that are determined.

The controller can be operable for user selection of a selected point on the aerial view, and to control generation of a displayed graphical representation of a marker point at the selected point. The controller also may be operable to at least one of generate an enlarged representation of the aerial view based on the marker point, center the aerial view at the marker point, and/or index the aerial view based on the maker point relative to other marker points of other views.

Alternatively, another system includes a controller operable to control management of products, vehicles, and activities within a first shipper/receiver (S/R) facility and a user device configured to communicate with the controller. The user device and the controller are operable to control generation of displayed representations of the products and the vehicles in the first S/R facility and a status and location of the products and the vehicles within the first S/R facility. The user device and the controller are further operable to provide selectable options to a user for managing the products and the vehicles within the first S/R facility. The controller also is operable to receive input from the user device to move at least one of the displayed graphical representations of the products or the vehicles to indicate one or more of moving the one or more of the products or the vehicles into storage, moving the one or more of the products or the vehicles out of the storage, repair of the one or more of the products or the vehicles, or replenishing the one or more of the products or the vehicles. The controller is operable to compare the input received from the user device with one or more designated criteria to determine whether the move, the repair, or the replenishment of the one or more products or the vehicles that is received from the user device is possible in the first S/R facility and, responsive to determining that the move, the repair, or the replenishment of the one or more products or the vehicles that is received from the user device is not possible, provide an indication to the user device that the move, the repair, or the replenishment of the one or more products or the vehicles that is input received from the user device is not possible.

The displayed representations can include a representation of at least one of the vehicles, and the controller can be configured to receive user input that indicates a move of the representation of the at least one of the vehicles within the first S/R facility. The controller can be configured to, responsive to receiving the user input and to communicate a control signal to the at least one of the vehicles to direct autonomous movement of the at least one of the vehicles according to the user input.

The system optionally can include at least one sensor disposed in the first S/R facility and configured to automatically determine the locations of the products and the vehicles within the first S/R facility. The at least one sensor can be configured to communicate information of the locations of the products and the vehicles within the first S/R facility to the controller. The controller can be further operable to control the generation of the displayed representations of the locations of the products the vehicles within the first S/R facility based on the information received from the at least one sensor.

The controller can be further configured to determine dwell times of the vehicles based at least in part of the information received from the at least one sensor, and to automatically control pre-blocking of containers of the products on the vehicles based at least in part on the dwell times that are determined.

A method performed by the systems described herein may include obtaining, by a controller, shipping and/or receiving information associated with products and vehicles located associated with a first shipper/receiver (S/R) facility. The method also can include processing, by the controller, the shipping information and/or the receiving information that is obtained to generate a graphical representation of the products and the vehicles located within the first S/R facility along with characteristics of the products and the vehicles. The method also can include providing, by the controller, selectable options to a user for reviewing and editing the shipping information and/or the receiving information, The method optionally can include receiving input from a user device to move the graphical representation of one or more of the products and/or the vehicles to indicate moving the one or more of the products and/or the vehicles into storage, moving the one or more of the products and/or the vehicles out of the storage, repair of the one or more of the products and/or the vehicles, and/or replenishing the one or more of the products or the vehicles, The controller is operable to compare the input received from the user device with one or more designated criteria to determine whether the move, the repair, and/or the replenishment of the one or more products or the vehicles that is received from the user device is possible in the first S/R facility and, responsive to determining that the move, the repair, and/or the replenishment of the one or more products or the vehicles that is received from the user device is not possible, provide an indication to the user device that the move, the repair, or the replenishment of the one or more products or the vehicles that is input received from the user device is not possible.

The method may include processing the shipping information and/or receiving information that is obtained to display the graphical representation of one or more of the products and the vehicles en route between the first S/R facility and a second S/R facility and displaying the graphical representation as one or more of a graphical icon and/or text information.

The method also can include obtaining and displaying characteristics of the products and the vehicles, where the characteristics include one or more of product type, vehicle container type, product status, weight information, and/or vehicle load/empty status. The shipping information and/or the receiving information can be obtained from an enterprise resource planning system.

In an embodiment, a system comprises a controller operable to provide selectable options to a user for managing at least one of products or vehicles within a first shipper/receiver (S/R) facility. The controller is also operable to control generation of displayed graphical representations of the first S/R facility, the at least one of products or vehicles within the first S/R facility, and one or more characteristics of the at least one of products or vehicles. For example, the system may further comprise a display screen, with the controller being operably connected to the display screen for controlling generation of the displayed graphical representations on the display screen.

In another embodiment of the system, the displayed graphical representation of the first S/R facility comprises an aerial view of at least one of a map of the first S/R facility or an aerial photographic view of the first S/R facility. The aerial view includes plural vehicle routes of the first S/R facility and one or more buildings of the S/R facility. The controller is also operable to control generation of the displayed graphical representations of the vehicles relative to the plural vehicle routes and the one or more buildings.

In another embodiment of the system, the displayed graphical representations of the vehicles are icons, and for each vehicle, the controller is operable to control the generation of the displayed graphical representation of the one or more characteristics of the vehicle when a user selects (e.g., clicks on, and/or rolls over) one of the icons corresponding to the vehicle. The displayed graphical representation of the one or more characteristics comprises at least one of text or pictorial information of the vehicle.

In another embodiment of the system, the displayed graphical representations of the vehicles relative to the plural routes comprise locations of the vehicles along the plural routes. The controller is operable to determine the locations based on received information about the vehicles (e.g., information entered by a user, or information automatically collected at the S/R facility by way of sensors or the like).

In another embodiment of the system, the controller is operable for user selection of a selected point on the aerial view, and to control generation of a displayed graphical representation of a marker point at the selected point. The controller is also operable to: generate an enlarged representation of the aerial view based on the marker point; center the aerial view at the marker point; and/or index the aerial view based on the maker point relative to other marker points of other views.

In another embodiment, a system has a controller and a user device operable to facilitate modification of a virtual representation of a S/R facility displayed on a display screen of the user device, facilitate the modification of characteristics of virtual representations of products and vehicles located within the S/R facility which are displayed on the display screen of the user device, and facilitate virtual movement of products and vehicles within the S/R facility on the display screen of the user device as commanded by a user, including the virtual loading and unloading of products onto and off of vehicles. The virtual representations and movements may correspond to actual facilities, products, vehicles, and actual characteristics and movements of those products and assets in the real world. The modification of a virtual representation of a S/R facility may include virtually adding or deleting routes or storage areas within the facility. The modification of characteristics of virtual representations of products and vehicles may include color coding the virtual products and vehicles. The modification of characteristics of virtual representations of products and vehicles may include assigning characteristics to the products and vehicles.

With reference to the drawings, like reference numerals designate identical or corresponding parts throughout the several views. However, the inclusion of like elements in different views does not mean a given embodiment necessarily includes such elements or that all embodiments of the invention include such elements.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it may be related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., may distinguish one element from another.

This written description uses examples to disclose the inventive subject matter and also to enable one of ordinary skill in the art to practice the inventive subject matter, including making and using any devices or systems and performing any incorporated methods. The embodiments described herein may be examples of articles, systems, and methods having elements corresponding to the elements of the inventive subject matter recited in the claims. This written description may enable those of ordinary skill in the art to make and use embodiments having alternative elements that likewise correspond to the elements of the inventive subject matter recited in the claims. The scope of the inventive subject matter thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A control system comprising:
a controller configured to determine locations of vehicles within a facility and to generate a display showing graphical representations of the facility, the vehicles within the facility, and characteristics of the facility based on the locations of the vehicles that are determined,
wherein the controller is configured to receive user input that indicates a change in a displayed location of the graphical representation of at least one of the vehicles, the change in the displayed location representing one or more of moving the at least one vehicle into storage, moving the at least one vehicle out of storage, repair of the at least one vehicle, or replenishment of the at least one vehicle,
wherein the controller is configured to determine whether the change indicated by the user input is possible with the at least one vehicle in the facility and to produce a notification to a user that the change is or is not possible based on whether the change is possible in the facility, and wherein the controller is configured to determine a dwell time of at least one of the vehicles based at least in part on sensor data received from at least one sensor disposed within the facility.

2. The control system of claim 1, wherein the controller is configured to generate one or more control signals, responsive to determining that the change indicated to by the user input is possible,
wherein the one or more control signals implement movement of the at least one vehicle.

3. The control system of claim 1, wherein the controller is configured to change display of at least one of the representations to indicate movement of the at least one vehicle within the facility.

4. The control system of claim 1, wherein the controller is configured to determine an arrival time of the at least one vehicle to a location in the facility based on one or more of a previous travel time, a weather condition, a road or track condition, or vehicle health.

5. The control system of claim 1, wherein the controller is configured to determine one or more characteristics of the vehicles within the facility and to generate the display showing the graphical representations of the vehicles based on the one or more characteristics.

6. The control system of claim 5, wherein the one or more characteristics of the vehicles include one or more of a vehicle container type, vehicle weight information, or a vehicle load status.

7. The control system of claim 1, wherein the user input indicates selection of a storage area in the facility.

8. The control system of claim 1, wherein the controller is configured to generate an aerial map of the facility as the graphical representation of the facility, wherein the controller is configured to display the graphical representations to indicate locations of vehicle routes within the facility.

9. The control system of claim 1, wherein the controller is configured to receive a user selection of at least one of the graphical representations of the vehicles and to display at least one of textual or pictorial information of at least one of the vehicles responsive to receiving the user selection.

10. The control system of claim 1, wherein the controller is configured to automatically control pre-blocking of a container on the at least one vehicle based at least in part on the dwell time that is determined.

11. A control system comprising:
a controller configured to determine locations of vehicles within a facility and to generate a display showing graphical representations of the facility, the vehicles within the facility, and characteristics of the facility based on the locations of the vehicles that are determined; and
at least one sensor disposed within the facility and configured to generate information relating to the locations of the vehicles within the facility,
wherein the controller is configured to receive user input that indicates a change in a displayed location of the graphical representation of at least one of the vehicles,
wherein the controller is configured to determine the locations of the vehicles based at least in part on the information generated by the at least one sensor, and
wherein the controller is further configured to generate one or more control signals responsive to determining that the change indicated by the user input is possible to at least one of implement movement of the at least one vehicle or change display of at least one of the graphical representations to indicate movement of the at least one vehicle within the facility.

12. A control method comprising, with a control system having one or more processors:
receiving signals from sensors within a facility;
determining locations of vehicles within the facility based on the signals that are received;
generating a display showing graphical representations of the facility, the vehicles within the facility, and characteristics of the facility based on the locations of the vehicles that are determined;
receiving user input that indicates a change in a displayed location of the graphical representation of at least one of the vehicles, the change in the displayed location representing one or more of moving the at least one vehicle into storage, moving the at least one vehicle out of storage, repair of the at least one vehicle, or replenishment of the at least one vehicle;
determining whether the change indicated by the user input is possible with the at least one vehicle in the facility; and
communicating a notification to a user that the change is or is not possible based on determining whether the change is possible in the facility.

13. The control method of claim 12, further comprising:
controlling movement of the at least one vehicle responsive to determining that the change indicated to by the user input is possible.

14. The control method of claim 12, further comprising:
changing display of at least one of the representations to indicate movement of the at least one vehicle within the facility.

15. The control method of claim 12, further comprising:
determining an arrival time of the at least one vehicle to a location in the facility based on one or more of a previous travel time, a weather condition, a road or track condition, or vehicle health.

16. The control method of claim 12, further comprising:
determining one or more characteristics of the vehicles within the facility, wherein the display showing the graphical representations of the vehicles is generated based on the one or more characteristics.

17. The control method of claim 16, wherein the one or more characteristics of the vehicles include one or more of a vehicle container type, vehicle weight information, or a vehicle load status.

* * * * *